(12) United States Patent
Huang et al.

(10) Patent No.: US 8,493,936 B2
(45) Date of Patent: Jul. 23, 2013

(54) METHOD AND DEVICE FOR HANDOVER BETWEEN UES IN PROCESS OF SENDING MESSAGE

(75) Inventors: Cheng Huang, Shenzhen (CN); Lunjian Mu, Shenzhen (CN); Jue Wang, Shenzhen (CN); Guojun Xu, Shenzhen (CN); Gang Liang, Shenzhen (CN); Yonggang Bian, Shenzhen (CN); Yongjing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 13/030,980

(22) Filed: Feb. 18, 2011

(65) Prior Publication Data

US 2012/0051322 A1 Mar. 1, 2012

Related U.S. Application Data

(63) Continuation of application No. PCT/CN2009/070987, filed on Mar. 24, 2009.

(30) Foreign Application Priority Data

Aug. 18, 2008 (CN) .......................... 2008 1 0147108

(51) Int. Cl.
*H04W 36/00* (2009.01)
(52) U.S. Cl.
USPC ........... 370/331; 370/328; 370/310; 455/436; 455/438; 455/439; 455/440
(58) Field of Classification Search
USPC .... 370/331, 310; 455/436, 438, 439; 709/227
See application file for complete search history.

(56) References Cited

U.S. PATENT DOCUMENTS

| 5,594,872 A | * | 1/1997 | Kawano et al. | 709/240 |
| 6,529,483 B1 | * | 3/2003 | Itjeshorst | 370/259 |
| 6,601,101 B1 | * | 7/2003 | Lee et al. | 709/227 |

(Continued)

FOREIGN PATENT DOCUMENTS

| CN | 1356834 A | 7/2002 |
| CN | 1951086 A | 4/2007 |

(Continued)

OTHER PUBLICATIONS

Written Opinion of the International Searching Authority issued in corresponding PCT Patent Application No. PCT/CN2009/070987, mailed Jul. 2, 2009.

(Continued)

*Primary Examiner* — Rasheed Gidado
(74) *Attorney, Agent, or Firm* — Brinks Hofer Gilson & Lione

(57) ABSTRACT

The present invention relates to mobile communication technologies, and discloses a method and a device for handover between User Equipment (UE) in a process of sending a message to enable the after-handover UE receive messages accurately. The method includes: receiving a UE handover request sent by a before-handover UE, wherein the UE handover request carries an identifier of an after-handover UE and indication parameters for sending a message; and sending the message to the after-handover UE according to the identifier of the after-handover UE and the indication parameters for sending the message. The embodiments of the present invention are applied to handover between UEs in the process of sending a message.

9 Claims, 15 Drawing Sheets

U.S. PATENT DOCUMENTS

| | | | |
|---|---|---|---|
| 6,915,136 B2 * | 7/2005 | Kikuta et al. | 455/461 |
| 7,191,233 B2 * | 3/2007 | Miller | 709/227 |
| 7,254,396 B2 * | 8/2007 | Karaoguz et al. | 455/440 |
| 7,272,123 B2 * | 9/2007 | Wall | 370/331 |
| 7,769,384 B2 * | 8/2010 | Lee et al. | 455/436 |
| 2002/0048266 A1 * | 4/2002 | Choi et al. | 370/331 |
| 2003/0012149 A1 | 1/2003 | Maggenti et al. | |
| 2006/0187943 A1 * | 8/2006 | Oh et al. | 370/401 |
| 2008/0019337 A1 * | 1/2008 | Tiirola et al. | 370/338 |

FOREIGN PATENT DOCUMENTS

| | | |
|---|---|---|
| CN | 1992961 A | 7/2007 |
| CN | 101048989 A | 10/2007 |
| CN | 101072242 A | 11/2007 |

OTHER PUBLICATIONS

Office Action issued in corresponding Chinese Patent Application No. 200810147108.8, mailed May 3, 2012.

International Search Report issued in corresponding PCT Application No. PCT/CN2009/070987; mailed Jul. 2, 2009.

Chinese Patent No. 101656991, issued on Mar. 20, 2013, granted in corresponding Chinese Patent Application No. 200810147108.8.

* cited by examiner

METHOD AND DEVICE FOR HANDOVER BETWEEN UES IN PROCESS OF SENDING MESSAGE

CROSS-REFERENCE TO RELATED APPLICATIONS

This application is a continuation of International Application No. PCT/CN2009/070987, filed on Mar. 24, 2009, which claims priority to Chinese Patent Application No. 200810147108.8, filed on Aug. 18, 2008, both of which are hereby incorporated by reference in their entireties.

FIELD OF THE INVENTION

The present invention relates to mobile communication technologies, and in particular, to a method and a device for handover between User Equipment (UE) in the process of sending a message.

BACKGROUND

In order to provide better service experience for users in the heterogeneous network environment nowadays, Open Mobile Alliance (OMA) specifications support multi-UE and multi-address of a user, namely, an address of record of a user corresponds to multiple UEs owned by the user, or one user owns multiple UEs registered as different addresses of record. Such users may choose to use any of the registered UEs for communication. When such a user participates in a message session, the OMA specifications allow multiple UEs of the user to join the session simultaneously, and allow the user to hand over between UEs in the process of the session.

In a session process, this scenario may exist: The receiver instructs the sender to hand over to another UE, namely, another UE (referred to as after-handover UE) of the receiver joins the session in place of the UE before handover (referred to as before-handover). In the prior art, the handover between UEs may be implemented in the process of sending a message in the following way: First, a session path is created between the message sending UE and the before-handover UE. If the before-handover UE expects to hand the session over to another UE, the before-handover UE instructs the message sending UE to stop sending the message, and then sends a UE handover message to the message sending UE as an instruction of handover. Afterward, the message sending UE sets up a session with the after-handover UE according to the UE handover message, and then the before-handover UE quits the session to the message sending UE.

In the process of developing the present invention, the inventor finds that the message being received by the UE before handover may be lost during handover between UEs in the prior art.

SUMMARY

The embodiments of the present invention provide a method and a device for handover between UEs in a process of sending a message to enable the after-handover UE receive the message accurately.

The embodiments of the present invention are based on the following technical solution:

A method for handover between UEs in a process of sending a message includes:

receiving a UE handover request sent by a before-handover UE, where the UE handover request carries an identifier of an after-handover UE and indication parameters for sending a message; and sending the message to the after-handover UE according to the UE handover request.

A method for handover between UEs in a process of sending a message includes:

generating a UE handover request that carries an identifier of an after-handover UE and indication parameters for sending a message; and sending the UE handover request so that a receiver of the UE handover request can send the messages to the after-handover UE according to the UE handover request and the indication parameters for sending the message.

The UE provided in an embodiment of the present invention is based on the following technical solution.

A UE includes:

a handover request receiving unit, configured to: receive a UE handover request sent by a before-handover UE, where the UE handover request carries an identifier of the before-handover UE, an identifier of an after-handover UE, and indication parameters for sending a message; and a message sending unit, configured to send the message to the after-handover UE or a home server of the before-handover UE according to the indication parameters for sending the message.

The UE provided in another embodiment of the present invention is based on the following technical solution.

A UE includes:

a handover request generating unit, configured to: generate a UE handover request that carries an identifier of a before-handover UE, an identifier of an after-handover UE, and indication parameters for sending a message; and a handover request sending unit, configured to send the UE handover request generated by the handover request generating unit.

A communication device provided in an embodiment of the present invention is based on the following technical solution.

A communication device includes:

a first session path creating unit, configured to: receive a session creation request message sent by a before-handover UE, and create a session path to the before-handover UE, where the session creation request message carries a first message identifier parameter and a first message range parameter;

a second session path creating unit, configured to: receive the session creation request message sent by a message sending UE, and create a session path to the message sending UE, where the session creation request message carries a second message identifier parameter and a second message range parameter;

a receiving unit, configured to receive messages, through the session path created between the communication device and the before-handover UE, sent by the before-handover UE according to the UE handover request, and messages, sent by the message sending UE, through the session path created between the communication device and the message sending UE according to the UE handover request; and a combining unit, configured to combine the messages received from the before-handover UE and the message sending UE according to the first message identifier parameter, the first message range parameter, the second message identifier parameter, and the second message range parameter.

A server provided in an embodiment of the present invention is based on the following technical solution.

A server includes:

a request receiving unit, configured to: receive a UE handover request sent by a before-handover UE, where the UE handover request carries an identifier of the before-handover UE, an identifier of an after-handover UE, and indication parameters for sending a message; and a handover operation unit, configured to send messages exchanged between the before-handover UE and the after-handover UE, or a message received by the before-handover UE and the after-handover UE, to the after-handover UE according to the UE handover request received by the request receiving unit.

Through the method and the device for handover between UEs in the process of sending a message in an embodiment of the present invention, the identifier of the before-handover UE, the identifier of the after-handover UE, and indication parameters for sending the message are carried in the UE handover request sent by the before-handover UE, and therefore, the entity that performs the handover operation can send the message exchanged between the entity and the before-handover UE to the after-handover UE accurately.

DETAILED DESCRIPTION OF THE EMBODIMENTS

To describe the technical solution under the present invention more clearly, the following describes the accompanying drawings involved in the embodiments of the present invention. Apparently, the accompanying drawings outlined below are not exhaustive, and persons of ordinary skilled in the art can derive other drawings from such accompanying drawings without creative efforts.

Figure 1:
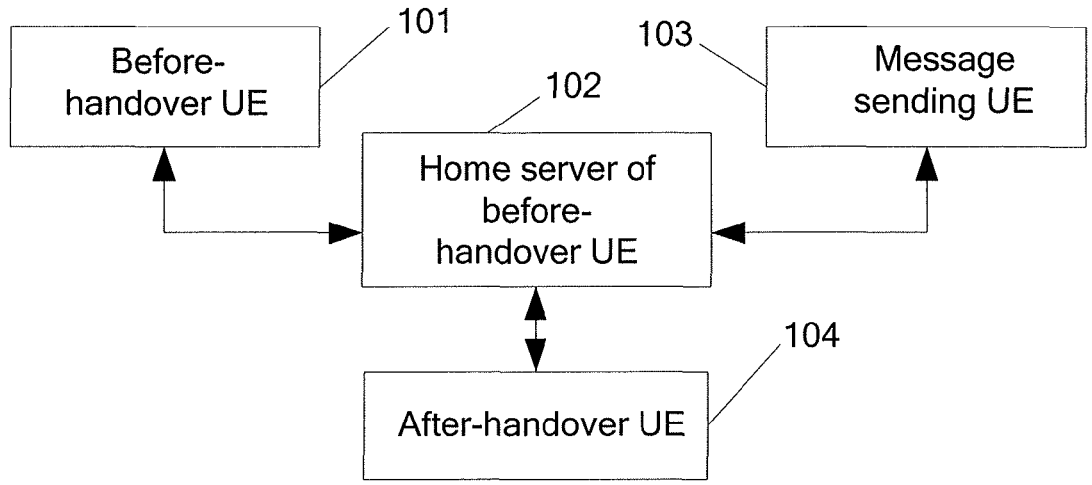
FIG. 1 shows a system for handover between UEs in a process of sending a message in an embodiment of the present invention.

As shown in FIG. 1, a system for handover between UEs in a process of sending a message in an embodiment of the present invention includes: a before-handover UE 101, a home server 102 of before-handover UE, a message sending UE 103, and an after-handover UE 104.

The before-handover UE 101 is configured to send a UE handover request to the message sending UE 101 or the home server 102 of the before-handover UE, where the UE handover request carries an identifier of the before-handover UE, an identifier of the after-handover UE, and indication parameters for sending a message; and/or send the buffered message exchanged with the message sending UE 103 to the server 102.

The home server 102 of the before-handover UE is configured to send messages exchanged between the message sending UE 103 and the before-handover UE 101 to the after-handover UE 104 according to the UE handover request if the messages exchanged between the message sending UE 103 and the before-handover UE 101 are buffered; or forward the UE handover request to the message sending UE 103 if the messages exchanged between the message sending UE 103 and the before-handover UE 101 are not buffered; or, receive the messages sent by the message sending UE 103 and the before-handover UE 101, combine the messages, and send them to the after-handover UE 104.

The message sending UE 103 is configured to send the messages exchanged between the message sending UE 103 and the before-handover UE 101 to the after-handover UE 104 according to the UE handover request if the home server 102 of the before-handover UE does not buffer the messages exchanged between the message sending UE 103 and the before-handover UE 101; or send the corresponding messages to the home server 102 of the before-handover UE according to the UE handover request so that the home server 102 of the before-handover UE can send the messages to the after-handover UE; or send the messages corresponding to the UE handover request to the after-handover UE 104.

The after-handover UE 104 is configured to receive the messages sent by the message sending UE 103, or the home server 102 of the before-handover UE, or the before-handover UE 101; and perform subsequent sessions with the message sending UE 103. The after-handover UE 104 is further configured to combine the messages sent by the message sending UE and the messages sent by the before-handover UE if the message sending mode is a successively sending mode.

In the first embodiment of the present invention, the indication parameters for sending the message in the UE handover request sent by the before-handover UE 101 include: message identifier, message deployment type, time of generating the message, range of messages to be sent, and message sending mode. The message sending mode includes resending mode and successively sending mode.

The resending mode means: The entity that performs the UE handover operation resends the messages to the after-handover UE, where the messages are exchanged between the message sending UE and the before-handover UE and compliant with the indication parameters for sending the message. In the resending mode, the entity that performs the UE handover operation may be the server or the message sending UE.

The server is classified into two types: stateful server and stateless server. A stateful server may provide two functions: a function that locates on the path of a session between the message sending UE and the before-handover UE and buffers messages exchanged between the message sending UE and the before-handover UE; and a signaling forwarding function. The service provider presets which function the server is capable of implementing in the process of sending a message. That is, the service provider presets that the server may buffer and forward the messages exchanged between the message sending UE and the before-handover UE, or only forward the messages being exchanged between the message sending UE and the before-handover UE.

If the server is located in the media path of the session between the message sending UE and the before-handover UE, namely, if the server has buffered the messages exchanged between the message sending UE and the before-handover UE, the server may resend the message to the after-handover UE according to the information in the UE handover request, where the message is being sent by the message sending UE to the before-handover UE. Alternatively, if the server is capable of implementing only the function of signaling forwarding, the message sending UE sends the messages exchanged between the message sending UE and the before-handover UE to the after-handover UE.

The successively sending mode means: Different entities that perform the handover operation each send corresponding messages to the after-handover UE. The successively sending mode may be implemented in at least two ways: (1) The before-handover UE sends the messages already received from the message sending UE to the after-handover UE; the message sending UE send the messages that have not been sent to the before-handover UE, to the after-handover UE; and then the after-handover UE combines the received messages; or (2) the before-handover UE sends the messages already received from the message sending UE to the home server of the before-handover UE; and the message sending UE sends the messages that have not been sent to the before-handover UE, to the server; and then the home server of the before-handover UE combines the received messages and sends them to the after-handover UE.

In practice, the UE handover request from the before-handover UE may be derived from the following messages: (1) A SIP REFER message in the Session Initiation Protocol (SIP) is extended so that the extended SIP REFER message can not only carry the UE handover message like the prior art, but also carry indication parameters for sending the message; or (2) the SIP INVITE message in the SIP protocol is extended, and therefore, by using the SIP REFER message in the prior art, the extended SIP INVITE message carries indication parameters for sending the message, and the SIP REFER message carries the UE handover information. The SIP REFER message above is the same as that in the prior art, and is designed to perform handover between UEs. The extended SIP INVITE message carries indication parameters for sending the message, and therefore, the entity in charge of sending a message can send the corresponding messages to the after-handover UE.

Figure 2:
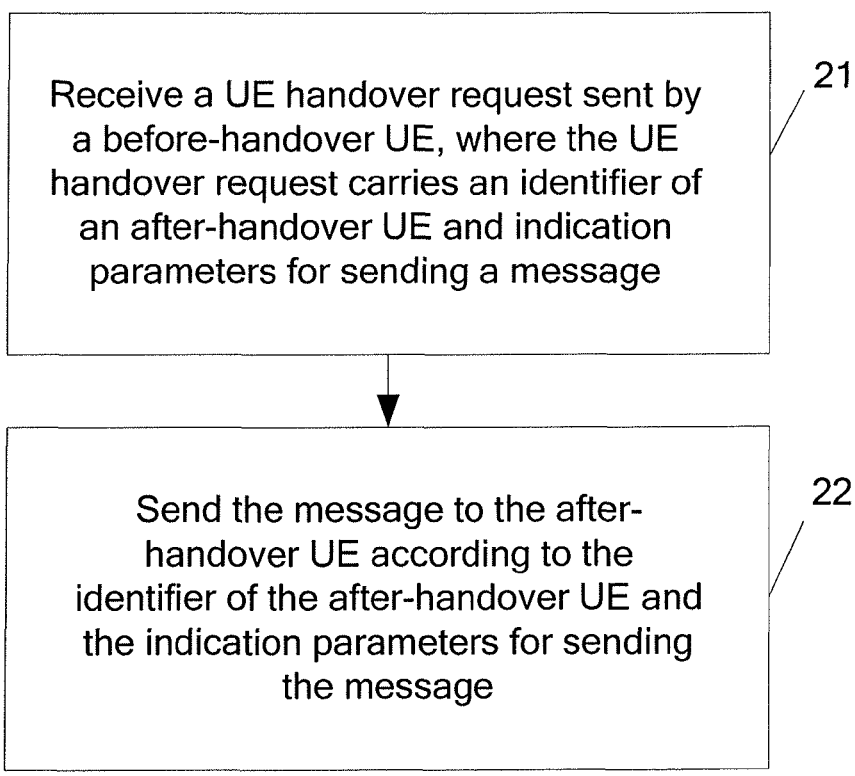
FIG. 2 is a flowchart of a method for handover between UEs in a process of sending a message in an embodiment of the present invention.

FIG. 2 is a flowchart of a method for handover between UEs in a process of sending a message in an embodiment of the present invention. The method includes the following steps:

Step 21: Receive a UE handover request sent by a before-handover UE, where the UE handover request carries an identifier of an after-handover UE and indication parameters for sending the message.

The UE handover request may further carry the identifier of the before-handover UE.

Step 22: Send the message to the after-handover UE according to the identifier of the after-handover UE and the indication parameters for sending the message.

As mentioned in the first embodiment, the entity that performs the UE handover operation may be the home server of the before-handover UE, or the message sending UE.

The following describes the process of handover between UEs in a process of sending a message in different modes with reference to exemplary embodiments. For brevity in the following embodiments, the message sending UE is called "UE A", the home server of UE A is called "server A", the before-handover UE is called "UE B", the home server of the before-handover UE is called "server B", and the after-handover UE is called "UE C". Like in the prior art, a message sent by UE A to UE B or UE C travels this path: UE A-Server A-Server B-UE B or UE C. A message sent by UE B or UE C to UE A travels this path: UE B or UE C-Server B-Server A-UE A. Nevertheless, UE B and UE C may belong to different servers. In this case, the message between UE A or UE B and UE C needs to be forwarded by the home server of UE C, namely, server C, instead of server B.

As mentioned above, the message sending mode applied to the handover between UEs in the process of sending a message may be a resending mode or a successively sending mode.

If the resending mode is applied, the UE handover request may be: an extended SIP REFER message; or a combination of an extended SIP re-INVITE message and a SIP REFER message. The handover process is detailed below with reference to exemplary embodiments.

In the first embodiment of the present invention, the sending mode indicated in the indication parameters for sending the message in the UE handover request is a resending mode; the UE handover request is an extended SIP REFER message; and a server processes the UE handover request.

Figure 3:
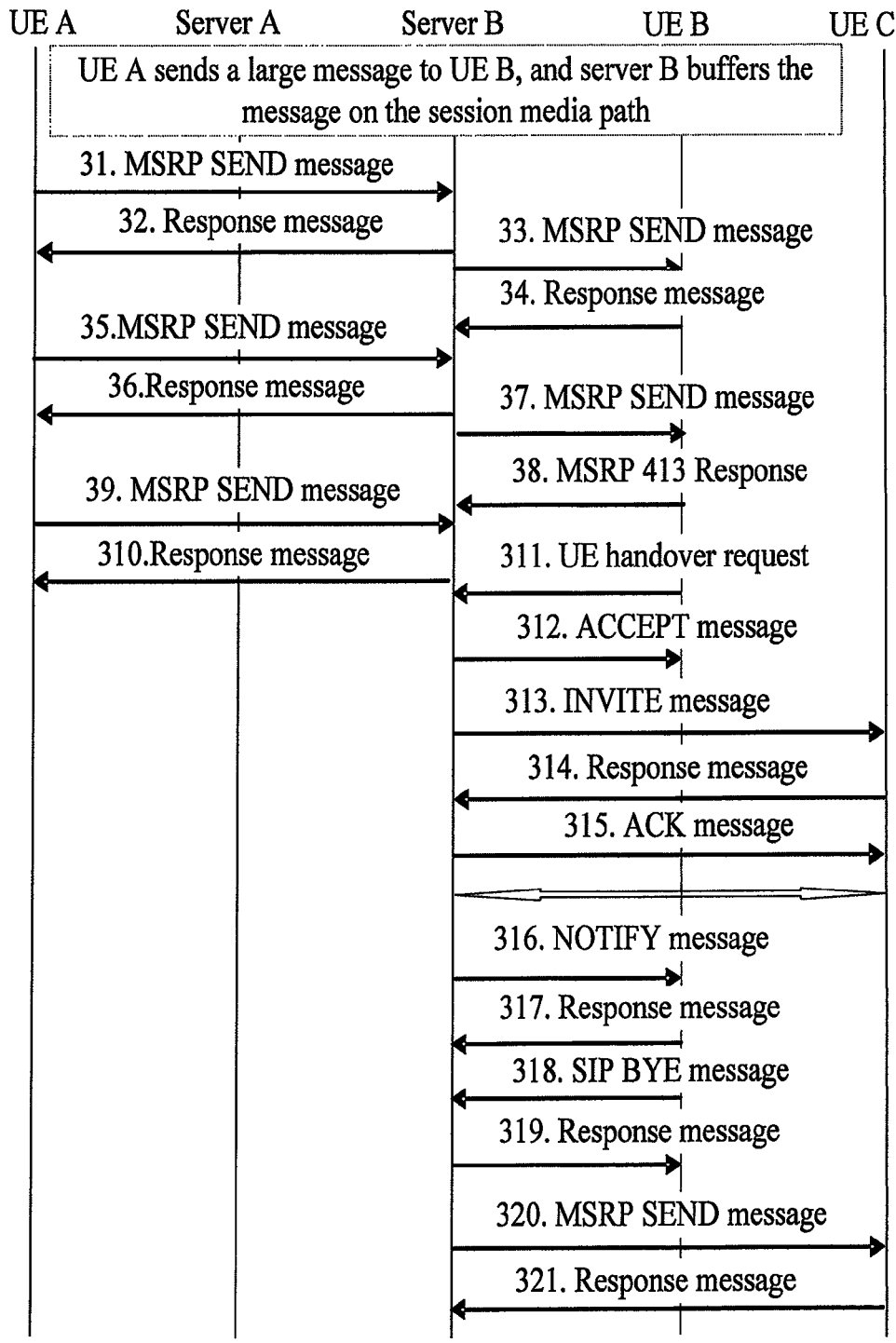
FIG. 3 is a flowchart of a method for handover between UEs in a process of sending a message in the first embodiment of the present invention.

FIG. 3 is a flowchart of a method for handover between UEs in a process of sending a message in an embodiment of the present invention. The method includes the following steps:

Step 31: UE A sends a Message Session Relay Protocol (MSRP) SEND message to server B through an MSRP media path.

In this step, a multimedia session is underway between UE A and UE B. That is, UE A and UE B are in a stage of session creation or session update, UE A and UE B agree, through an OFFER/ANSWER mechanism based on the Session Description Protocol (SDP) in the SIP protocol in a stage of session creation or session update, on the parameters of the message to be transmitted in the session, for example, message identifier "File-Selector". A message identifier includes: message name, message size, message type, globally unique hash value, message deployment type, and time of generating the message. In the session, UE A sends a large message to UE B, for example, sends an MSRP SEND message through the created MSRP media path, and server B is located in the media path of the session between UE A and UE B.

Step 32: Server B sends an MSRP 200 OK response message to UE A.

Step 33: According to presetting, server B buffers part of a messages which is sent by UE A to UE B, for example, the first 300 bytes of the message (file range: 1-300), and sends the MSRP SEND message to UE B.

Step 34: UE B returns an MSRP 200 OK response message to server B.

Step 35: UE A continues sending the MSRP SEND message to server B.

Step 36: Server B returns an MSRP 200 OK response message to UE A.

Step 37: Server B buffers the message. For example, the range of the buffered message is file range: 301-700, namely, 400 bytes in the middle of the buffered message. Server B sends the MSRP SEND message to UE B.

Step 38: If UE B expects to hand the session over to another UE at this time, UE B sends an MSRP 413 Response to server B, instructing server B to stop sending a message to UE B.

Step 39: UE A continues sending the MSRP SEND message to server B. Server B buffers the part of the messages. For example, the range of the buffered message is file range: 701-1000.

Step 310: Server B sends an MSRP 200 OK response message to UE A. Because server B has received the MSRP 413 Response from UE B in step 38, server B stops forwarding the received messages to UE B.

Step 311: UE B sends an extended UE handover request message "SIP REFER" to server B. The UE handover request carries the identifier of UE A (message sending UE), the identifier of UE B (before-handover UE), and the identifier of UE C (after-handover UE). In addition, in order to enable UE B to receive messages that are not completely received by UE B, after handover correctly, the "Refer-To" header field of the SIP REFER message further carries indication parameters for sending the message applied during handover of the UE. The indication parameters for sending the message include: message identifier "File-Selector", message deployment type, time of generating the message, message sending range, or message sending mode. The message identifier includes: message name, message size, message type, and globally unique hash value. For example, the Refer-To header field may be:

Refer-To: <"sip:UE_C@example.com?method=INVITE?m=message a=file-selector:name:"My cool picture.jpg" type:image/jpeg/ size:1000 a=file-range: 1-*>

Step 312: Server B sends a SIP 202 Accept message to UE B.

Step 313: According to the identifier of UE C (after-handover UE) in the extended SIP REFER message, server B sends a SIP INVITE message to UE C to create a session path toward UE C.

In this step, after receiving the extended SIP REFER message, server B judges whether the messages exchanged between UE A and UE B are buffered on server B. In this embodiment, according to the setting of the service provider, server B is capable of implementing the two functions of message buffering and signaling forwarding. Therefore, the messages exchanged between UE A and UE B are buffered by server B. Meanwhile, according to the parameter "size: 1000 a=file-range: 1-*>" in the UE handover request, the message sending mode is "resending", and the sending range is "all messages". At the same time, the SIP Invite message carries the sending indication parameters carried in the UE handover request, and therefore, the created session path is capable of sending a message, and server B can send the buffered message to UE C (after-handover UE).

Step 314: UE C sends a SIP 200 OK response message to server B to accept creation of the session path.

Step 315: Server B returns a SIP ACK message to UE C to confirm creation of the session path.

Step 316: When UE C joins the session of server B, server B sends a SIP NOTIFY message to UE B, indicating success of the handover operation.

Step 317: UE B sends a SIP 200 OK response message to server B, indicating success of the handover operation.

Step 318: UE B sends a SIP BYE message to server B to quit the session with server B.

Step 319: Server B sends a SIP 200 OK response message to UE B, indicating acceptance of quitting the session.

Step 320: Through the created session path between the sever B and the UE C, server B sends an MSRP SEND message that carries the buffered message to UE C according to the message sending range in the indication parameters for sending the message and other parameters.

Step 321: UE C returns a SIP 200 OK response message to receive the buffered messages. The message sending range in this embodiment is "all messages".

In the second embodiment of the present invention, the sending mode indicated in the indication parameters for sending the message in the UE handover request is a resending mode; the UE handover requests include an extended SIP re-INVITE message and a SIP REFER message; and a server processes the UE handover requests.

Figure 4A:
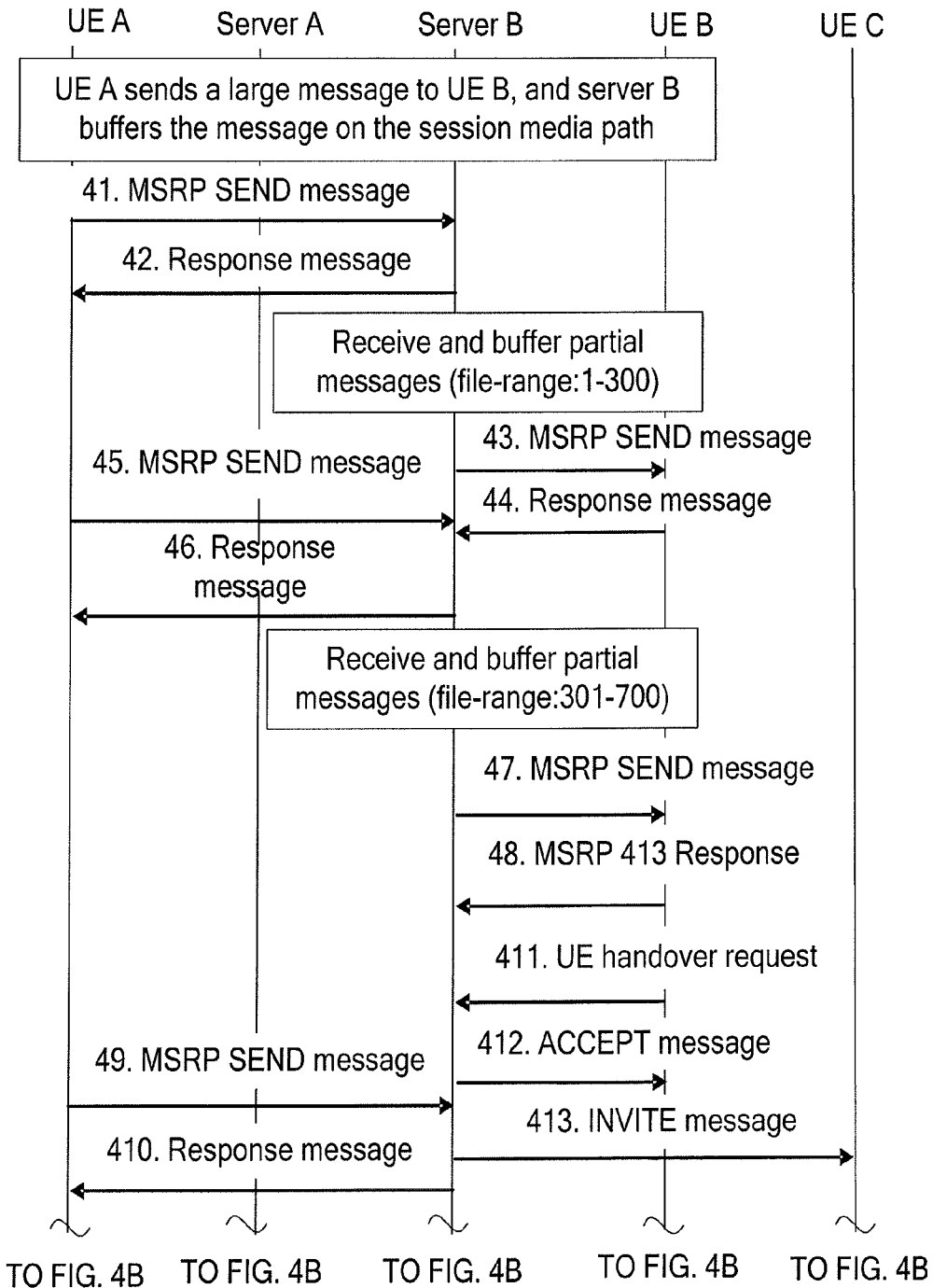
FIGS. 4A and 4B are a flowchart of a method for handover between UEs in a process of sending a message in the second embodiment of the present invention.
Figure 4B:
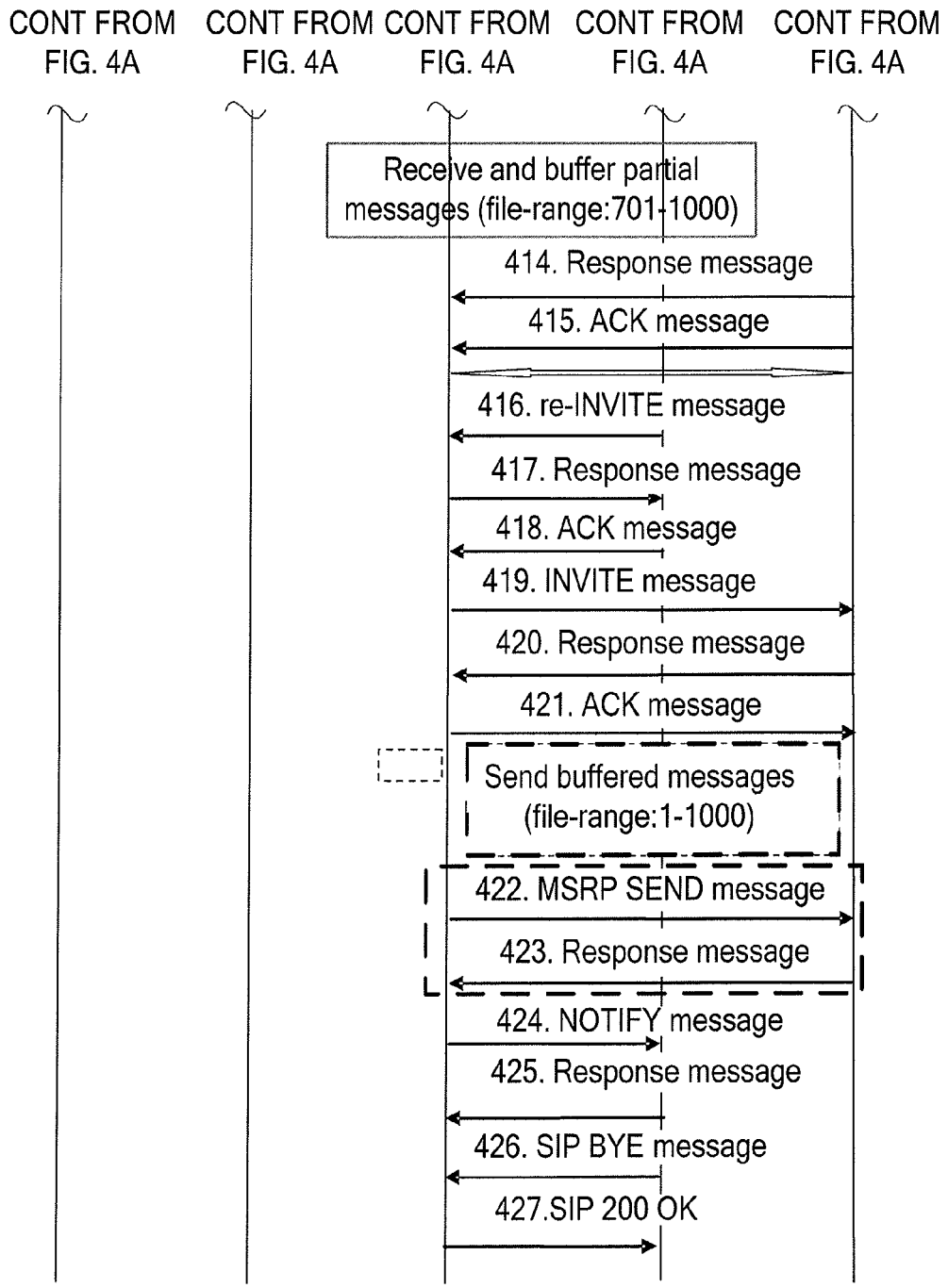

FIGS. 4 and 4B are a flowchart of a method for handover between UEs in a process of sending a message in the second embodiment of the present invention. The method includes the following steps:

Steps 41-410 are the same as steps 31-310 in the first embodiment.

Step 411: UE B sends a UE handover request "SIP REFER" to server B, instructing server B to hand the session over to another UE. The UE handover request carries: an identifier of UE A (message sending UE), an identifier of UE B (before-handover UE), and an identifier of UE C (after-handover UE).

Step 412: Server B returns a SIP 202 Accept message to UE B.

Step 413: According to the identifier of UE C, server B sends a SIP INVITE message to UE C to create a message sending session path to UE C and request UE C to join the session.

Step 414: UE C sends a SIP 200 OK message to server B in response to the SIP INVITE message.

Step 415: Server B sends a SIP ACK message to UE C.

Step 416: UE B sends a SIP re-INVITE message to server B, requesting to cut off the message transmission path. That is, the port ID in the media line "m=message" is set to "0" in the SDP part of the SIP re-INVITE message body. In addition, a "file-receiver_list" parameter may be added into the message sending indication parameter part to indicate addresses of other receiving UEs of the message, and therefore, after the handover, UE C (after-handover UE) can receive the messages that are not completely received by UE B. The value of this parameter may be a URI of a specific SIP User Agent (UA), or may be the corresponding value for locating a "Content-ID" header field in the message body whose Content-Type is "application/resource-lists+xml".

Step 417: Server B returns a SIP 200 OK response message to UE B.

Step 418: UE B returns a SIP ACK message to server B.

Step 419: After receiving the SIP re-INVITE message, server B judges whether server B itself is located on the message sending media path between UE A and UE B, namely, whether server B itself buffers messages. In this embodiment, according to the setting of the service provider, server B is capable of implementing the two functions of message buffering and signaling forwarding. Therefore, according to the "file-receiver-list" parameter in the indication parameters for sending the message, server B sends a SIP INVITE message to create a session with UE C.

Step 420: UE C sends a SIP 200 OK response message to server B.

Step 421: Server B sends a SIP ACK message to UE C.

Step 422: Through the session path created between the server B and UE C, server B uses an MSRP SEND message to send buffered messages to UE C.

Step 423: UE C returns an MSRP 200 OK response message to server B.

Step 424: When UE C joins the session of server B, server B sends a SIP NOTIFY message to UE B, indicating success of the handover operation.

Step 425: UE B sends a SIP 200 OK response message to server B.

Step 426: UE B sends a SIP BYE message to server B to quit the session with server B.

Step 427: Server B sends a SIP 200 OK response message to UE B.

In the third embodiment of the present invention, the sending mode indicated in the indication parameters for sending the message in the UE handover request is a resending mode; the UE handover request is an extended SIP REFER message; and a message sending UE processes the UE handover request.

Figure 5A:
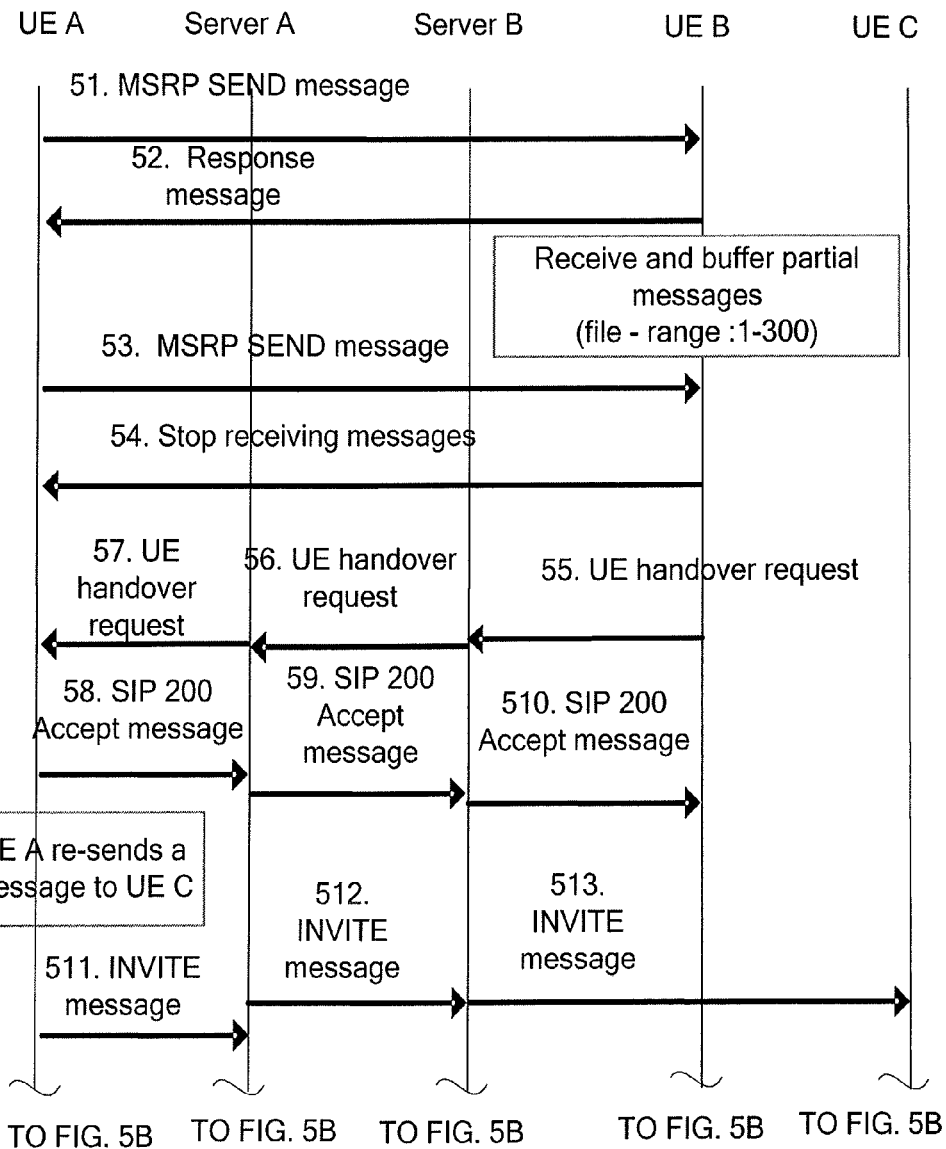
FIGS. 5A and 5B are a flowchart of a method for handover between UEs in a process of sending a message in the third embodiment of the present invention.
Figure 5B:
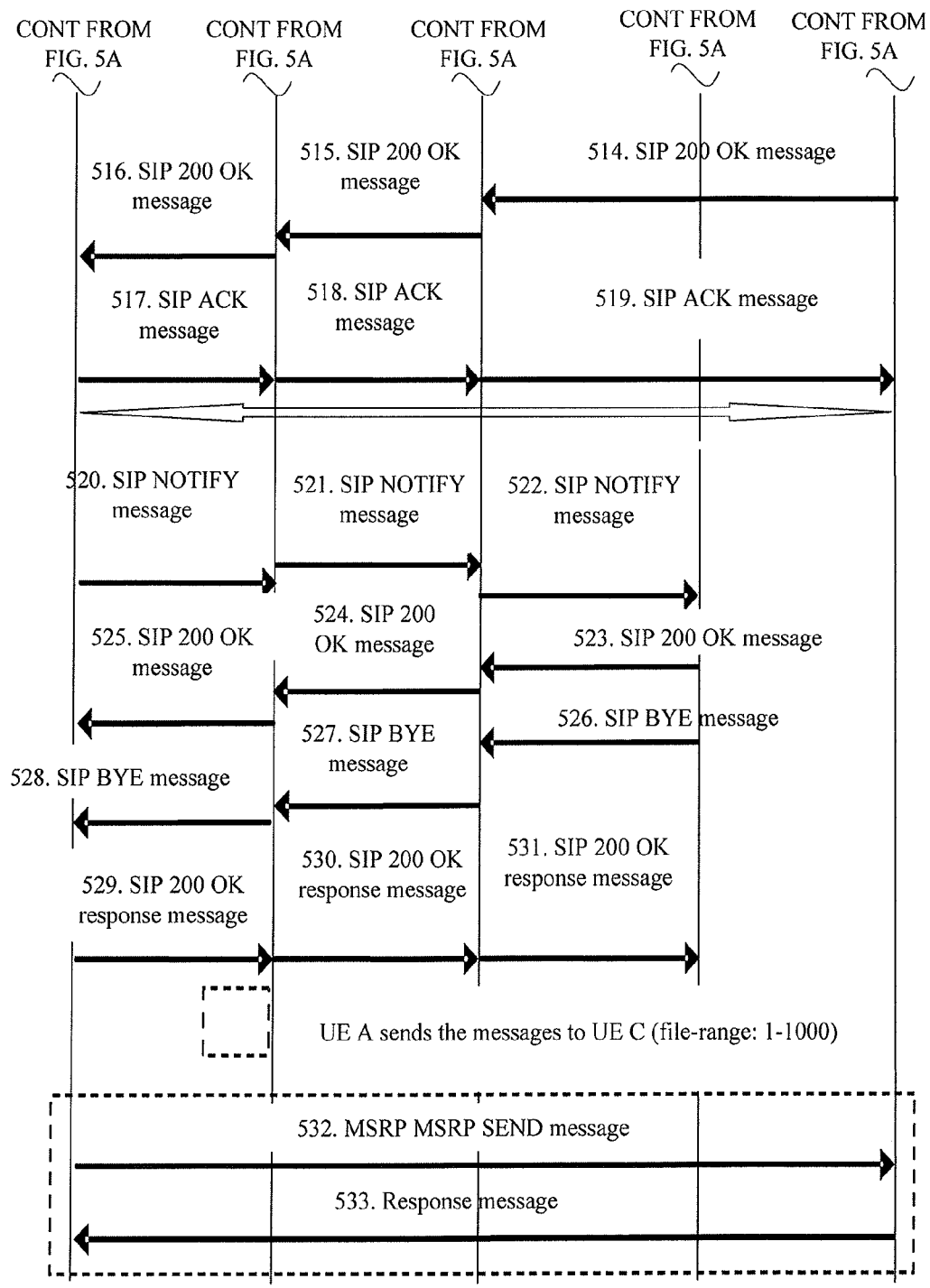

FIGS. 5 and 5B are a flowchart of a method for handover between UEs in a process of sending a message in the third embodiment of the present invention. The method includes the following steps:

Step 51: UE A sends an MSRP SEND message to UE B through server B. The message sending range is file-range: 1-300.

Step 52: UE B returns an MSRP 200 OK response message to UE A.

In this embodiment, according to the setting of the service provider, server B is not in the media path, namely, server B is capable of implementing only the function of signaling forwarding.

Step 53: UE A continues sending the MSRP SEND message to UE B.

Step 54: At this time, UE B needs to perform UE handover. Therefore, UE B returns an MSRP 413 Response to UE A through server B, indicating stop of receiving messages.

Steps 55-57: UE B sends a UE handover request message "SIP REFER" to UE A through server B.

Like in the preceding embodiment, the SIP REFER message carries indication parameters for sending the message, in which the message sending mode is a resending mode and the message sending range is "all messages". According to the setting of the service provider, server B is capable of implementing only the function of signaling forwarding. Therefore, after receiving the message, server B forwards the message to UE A directly.

Steps 58-510: UE A sends a SIP 200 Accept message to UE A through server B.

Steps 511-513: After receiving the SIP REFER message from UE B, UE A sends a SIP INVITE message to UE C through server B to invite the new UE involved in the handover, where UE C is an after-handover UE indicated in the SIP REFER message; meanwhile, the SIP INVITE request carries the indication parameters for sending the message in the extended SIP REFER message additionally. Therefore, the message sending capability is added in the session created between UE A and UE C, and UE A is capable of sending the message indicated in the SIP REFER message to UE C.

Steps 514-516: UE C sends a SIP 200 OK message to UE A through server B.

Steps 517-519: UE A sends a SIP ACK message to UE C through server B.

Steps 520-522: After the handover succeeds, UE A sends a SIP NOTIFY message to UE B through server B.

Steps 523-525: UE B sends a SIP 200 OK message to UE A through server B.

Steps 526-528: UE B sends a SIP BYE message to UE A through server B to terminate the session with UE A.

Steps 529-531: UE A sends a SIP 200 OK response message to UE B through server B.

Step 532: Based on the session path created above, according to the indication parameters for sending the message, UE A resends the corresponding messages to UE C through the MSRP SEND message.

Step 533: UE C sends an MSRP 200 OK response message to UE A.

In the fourth embodiment of the present invention, the message sending mode is a resending mode; the UE handover requests include an extended SIP re-INVITE message and a SIP REFER message; and a message sending UE serves as the entity that performs the UE handover operation.

The fourth embodiment differs from the second embodiment in that: According to the setting of the service provider, server B is capable of implementing only the function of signaling forwarding. That is, server B does not buffer messages exchanged between UE A and UE B, but forwards such messages directly.

As mentioned above, the message sending mode applied to the handover between UEs in the process of sending a message may be a resending mode or a successively sending mode. If the sending mode is successively sending, server B is capable of implementing only the function of signaling forwarding, namely, forwards the messages exchanged between UE A and UE B. For example, in the fifth embodiment, the message sending mode is successively sending, and the UE handover requests include an extended SIP REFER message.

Figure 6A:
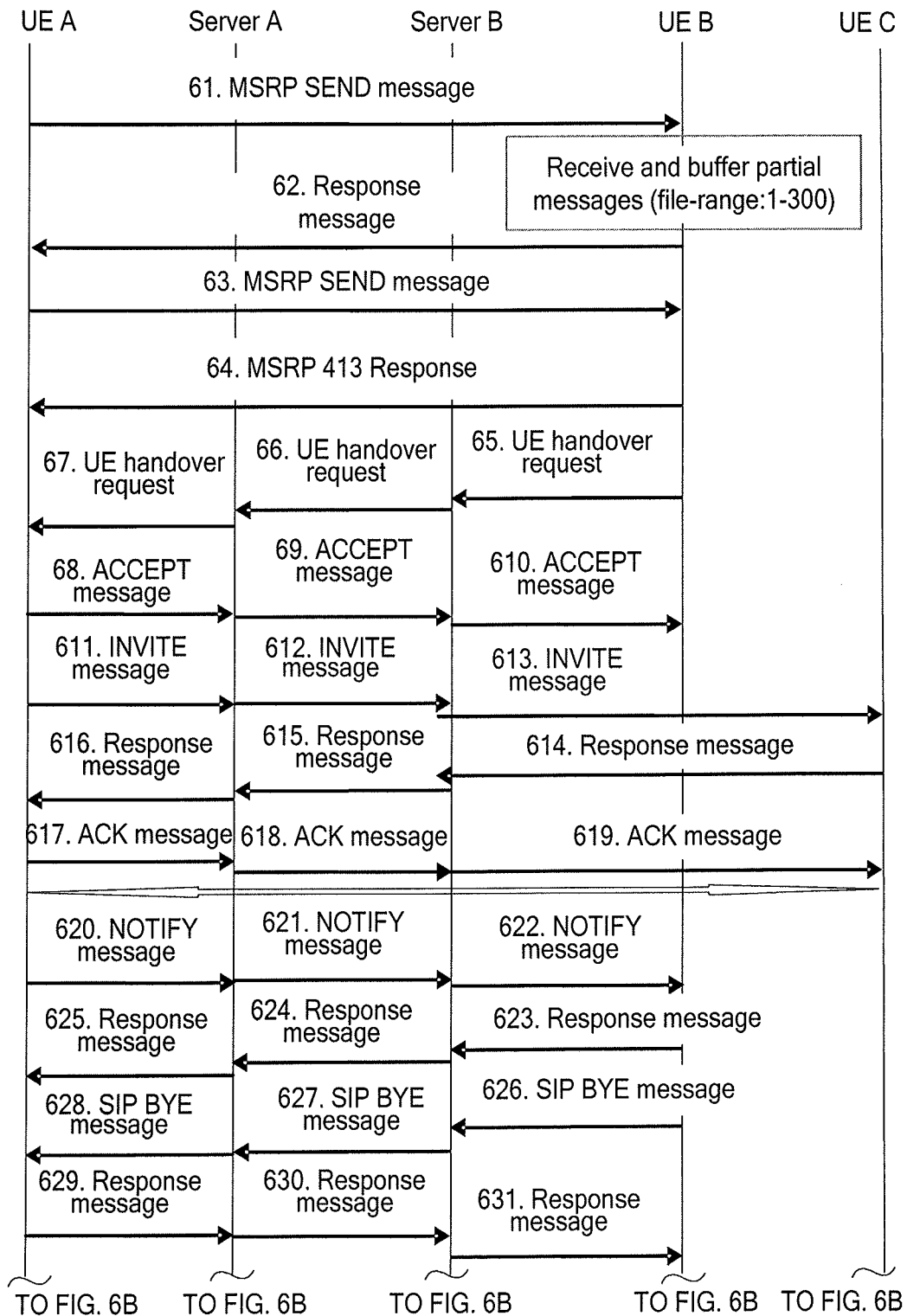
FIGS. 6A and 6B are a flowchart of a method for handover between UEs in a process of sending a message in the fifth embodiment of the present invention.
Figure 6B:
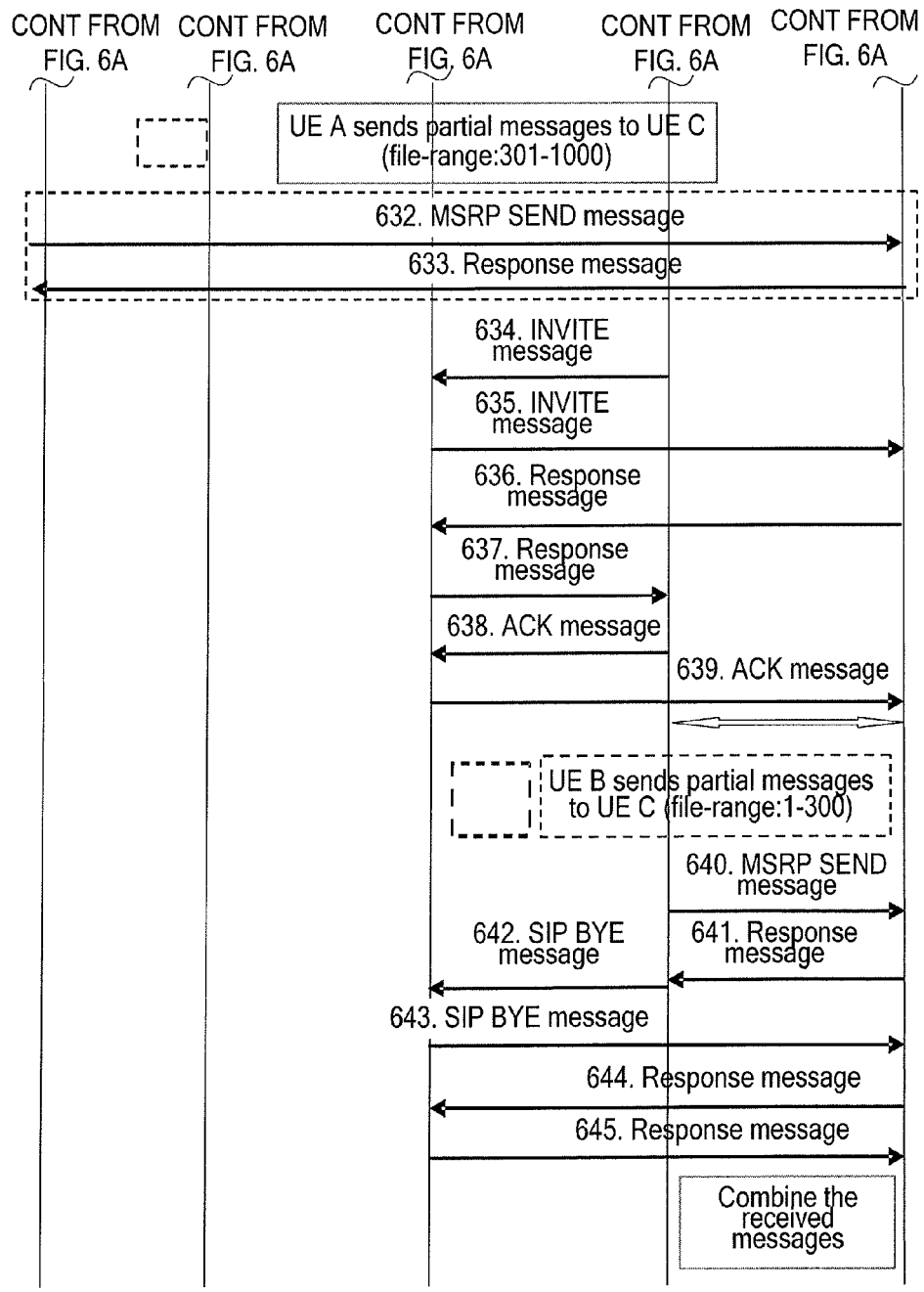

FIGS. 6 and 6B are a flowchart of a method for handover between UEs in a process of sending a message in the fifth embodiment of the present invention. The method includes the following steps:

Step 61: UE A sends an MSRP SEND message to UE B.

In this step, a multimedia session is underway between UE A and UE B. That is, UE A and UE B are in a stage of session creation or update. Through an OFFER/ANSWER mechanism based on SDP in the SIP protocol, UE A and UE B agree on the parameters of the message to be transmitted in the session, for example, message identifier "File-Selector". A message identifier includes: message name, message size, message type, globally unique hash value, message deployment type, and time of generating the message. In the session, UE A sends a large message to UE B, for example, sends an MSRP SEND message through the created MSRP media path, and server B is located in the media path of the session between UE A and UE B, namely, the MSRP SEND message sent by UE A arrives at server B first. After receiving the message forwarded by server B, UE B buffers the corresponding message.

Step 62: UE B sends an MSRP 200 OK response message to UE A.

Step 63: UE A continues sending the MSRP SEND message to UE B.

Step 64: UE B expects to hand the session over to another UE. UE B sends an MSRP 413 Response message to server B to indicate stop of receiving messages, and server B forwards the message to UE A, instructing UE A to stop sending a message.

Steps 65-67: UE B sends an extended UE handover request "SIP REFER" to server B.

The extended SIP REFER message is similar to that in the preceding embodiment, but differs in that: The message sending range indicated in the indication parameters for sending the message carried in this message is not "all messages"; instead, UE A sends the messages, which are exchanged between UE B and UE A but are not buffered by UE B, to UE C. For example, if the length of the message between UE A and UE B is 1000 bytes and UE B has received 300 bytes of them, the message sending range indicated in the indication parameters for sending the message is the remaining 700 bytes. Server B sends the extended SIP REFER message to UE A.

Steps 68-610: UE A sends an Accept message to server B, and server B sends a SIP 202 Accept message to UE B.

Steps 611-613: UE A sends a SIP INVITE message to UE C through server B, requesting to create a message sending session path between the UE A and the UE C. As indicated by the indication parameters for sending the message, UE A sends messages to UE C through the message sending session path between the UE A and the UE C.

In order to help UE C know which precise part of the message is sent by UE A to UE C and know the type of the sent message, the SDP message media line "m=message" of the SIP INVITE message sent by UE A or UE B carries the first or second message identifier parameter "file-selector" and the second message range parameter "file-range" in the indication parameters for sending the message. The second message identifier message helps UE C know whether the received message is the same as the previously received message, and the second message range parameter helps UE C know how the received part is located in the same message. For example, the second message identifier parameter and the second message range parameter may be carried in one of the following messages:

--- m=message 1234 TCP/MSRP *
a=file-selector:name:"My cool picture.jpg" type:image/jpeg size= 1000
a=file-range:301-1000
and
m=message 5678 TCP/MSRP *
a=file-selector:name:"My cool picture.jpg" type:image/jpeg size= 1000
a=file-range:1-300

---

Steps 617-619: UE A sends a SIP ACK message to UE C through server B.

Steps 620-622: UE A sends a SIP NOTIFIY message to UE B through server B, indicating success of the handover operation.

Steps 623-625: UE B sends a SIP 200 OK response message to UE A through server B.

Steps 626-628: UE B sends a SIP BYE message to UE A through server B to quit the session with server B. Server B sends a message to UE C to indicate that UE B quits the session successfully.

Steps 629-631: UE A sends a SIP 200 OK response message to UE B through server B.

Steps 632-633: UE A sends the corresponding message to UE C through an MSRP SEND message.

Step 623: UE C sends an MSRP 200 OK response message to UE A.

Steps 634-635: UE B sends a SIP INVITE message to UE C through server B, requesting to create a message sending session path between the UE B and UE C, and send the messages indicated by the indication parameters for sending the message to UE C through the message sending session path between the server B and the UE C. Like in step 611, the SIP INVITE message in step 634 carries the first message identifier parameter and the first message range parameter of the same meanings.

Steps 636-637: UE C sends a SIP 200 OK response message to UE B through server B.

Steps 638-639: UE B sends a SIP ACK message to UE C through server B.

Steps 640-641: UE B sends the corresponding message to UE C through an MSRP SEND message, and receives the MSRP 200 OK response message sent by UE C.

After receiving the messages from UE A and UE B respectively, UE C combines all parts of the messages according to the first message identifier parameter, the first message range parameter, the second identifier parameter, and the second message range parameter.

Steps 642-643: UE B sends a SIP BYE message to UE C through server B to quit the session.

Steps 644-645: UE C sends a SIP 200 OK response message to UE B through server B.

In the sixth embodiment of the present invention, the message sending mode is a successively sending mode; and the UE handover requests include an extended SIP re-INVITE message and a SIP REFER message.

Figure 7A:
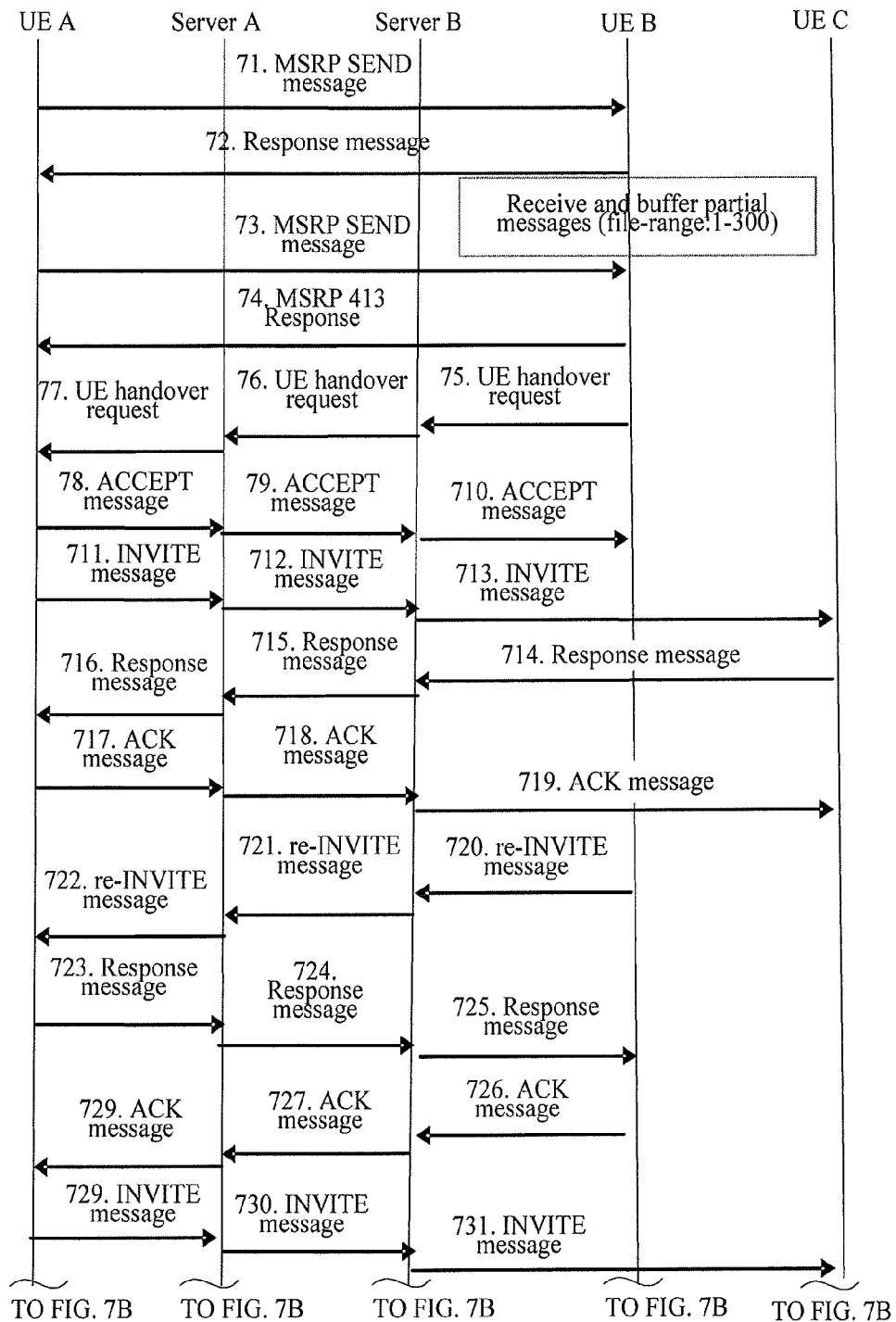
FIGS. 7A and 7B are a flowchart of a method for handover between UEs in a process of sending a message in the sixth embodiment of the present invention.
Figure 7B:
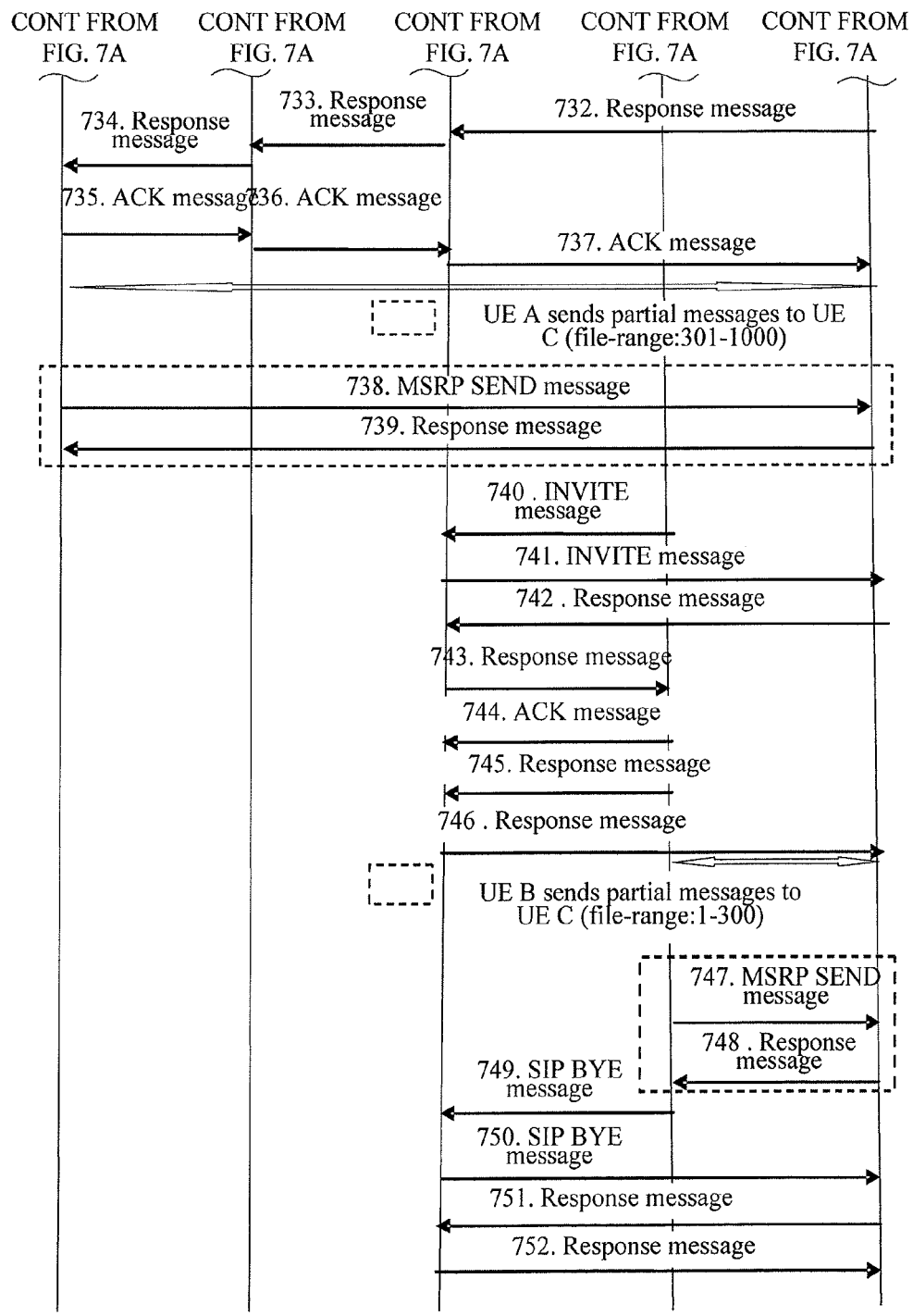

FIGS. 7 and 7B are a flowchart of a method for handover between UEs in a process of sending a message in the sixth embodiment of the present invention. The method includes the following steps:

Steps 71-74 are the same as steps 61-64 in the fifth embodiment.

Steps 75-77: UE B sends a UE handover request "SIP REFER" to server B. Server B forwards the SIP Refer message to UE A, instructing UE A to hand the session over to another UE. The message includes: an identifier of UE A (message sending UE), an identifier of UE B (before-handover UE), and an identifier of UE C (after-handover UE).

Steps 78-710: UE A sends a SIP 202 Accept message to UE B through server B.

Steps 711-713: According to the identifier of UE C, UE A sends a SIP INVITE message to UE C through server B to create a session path to UE C and request UE C to join the session.

Steps 714-716: UE C sends a SIP 200 OK response message to UE A through server B to accept the joining.

Steps 717-719: UE A sends a SIP ACK message to UE C through server B.

Steps 720-722: UE B sends an extended SIP re-INVITE message to server B. Server B sends the SIP re-INVITE message to UE A. The extended SIP re-INVITE message carries the identifier of the after-handover UE and indication parameters for sending the message. The indication parameters for sending the message sent to UE A indicate the range of messages to be sent to UE C.

Steps 723-725: UE A sends a SIP 200 OK message to UE B through server B.

Steps 726-728: UE A sends a SIP ACK message to UE A through server B.

Steps 729-731: According to the identifier of the after-handover UE, UE A sends a SIP INVITE message to UE C through server B, and creates a message sending session path between the UE A and UE C.

Steps 732-734: UE C sends a SIP 200 OK response message to UE A through server B.

Steps 735-737: UE A sends a SIP ACK message to UE A through server B.

Steps 738-739: According to the message sending range indicated by the indication parameters for sending the message, UE A sends the corresponding message to UE C through an MSRP SEND message; and UE C returns an MSRP 200 OK message to UE A.

Steps 740-741: UE B sends a SIP INVITE message to UE C through server B to create a session path to UE C.

The SIP INVITE message sent by UE A and UE B to UE C carries the first or second message identifier parameter and the first or second message range parameter so that UE C can combine the messages after receiving all parts of the message.

Steps 742-743: UE C sends a SIP 200 OK response message to UE B through server B.

Step 744: UE B sends a SIP ACK message to server B.

Steps 745-746: UE B sends a SIP 200 OK response message to UE C through server B.

Steps 747-748: UE B sends the corresponding messages buffered on it to UE C through an MSRP SEND message. UE C sends an MSRP 200 OK response message to UE B.

Steps 749-750: UE B sends a SIP BYE message to UE C through server B to quit the session, and receives the SIP 200 OK response message from UE C through server B.

Steps 751-752: UE C sends a SIP 200 OK response message to UE B through server B.

Finally, UE C combines the received parts of the messages.

In the foregoing process, the messages may be sent first, and then the session is handed over between the UEs.

In the seventh embodiment, the message sending mode is successively sending, and the UE handover requests include an extended SIP INVITE message.

Figure 8:
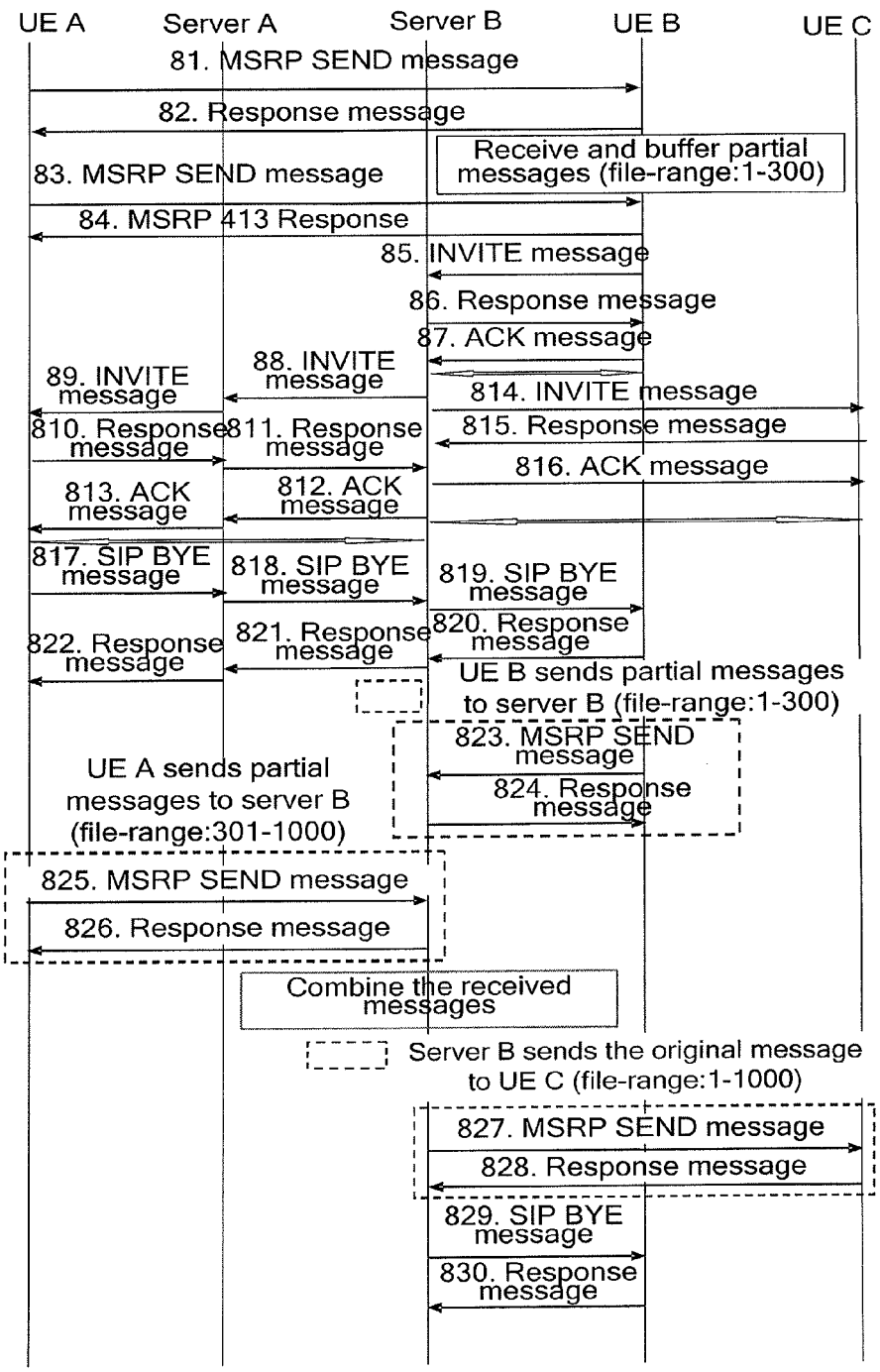
FIG. 8 is a flowchart of a method for handover between UEs in a process of sending a message in the seventh embodiment of the present invention.

FIG. 8 is a flowchart of a method for handover between UEs in a process of sending a message in the seventh embodiment of the present invention. The method includes the following steps:

Step 81: UE A sends an MSRP SEND message to UE B through an MSRP media path.

A multimedia session is underway between UE A and UE B. That is, UE A and UE B are in a stage of session creation or update. Through an OFFER/ANSWER mechanism based on SDP in the SIP protocol, UE A and UE B agree on the parameters of the message to be transmitted in the session, for example, message identifier "File-Selector". A message identifier includes: message name, message size, message type, globally unique hash value, message deployment type, and time of generating the message. In the session, UE A sends a large message to UE B, for example, sends an MSRP SEND message through the created MSRP media path, and server B is located in the media path of the session between UE A and UE B, namely, the MSRP SEND message sent by UE A arrives at server B first. After receiving the message forwarded by server B, UE B buffers the corresponding message.

Step 82: UE B sends an MSRP 200 OK response message to UE A.

Step 83: UE A continues sending the MSRP SEND message to UE B.

Step 84: UE B wants to perform UE handover. Therefore, UE B returns an MSRP 413 Response to UE A through server B, indicating stop of receiving messages.

Step 85: UE B sends a SIP INVITE message to server B, instructing server B to perform UE handover.

The message body of the SIP INVITE message carries an SDP part that describes the session media type, where the Content-Type of the SDP part is "application/sdp"; and carries a session participant list whose Content-Type is "application/resource-lists+xml". The SDP part gives the media type description part before the session is handed over, and the media type description part includes the indication parameters for sending the message. Through the media type description part, server B can create an after-handover session with UE A and UE C respectively, and this session is capable of transmitting messages. The session participant list part gives the SIP URI of the UE that needs to be contacted by server B, and the indication parameters for sending the message extended for controlling message transmission of different UEs in this embodiment. The indication parameters for sending the message include: message transmission direction attribute, and message sending range.

Server B crates a session with UE B according to the received SIP INVITE request.

Step 86: Server B sends a SIP 200 OK response message to UE B.

Step 87: UE B sends a SIP ACK message to server B.

Steps 88-89: Server B sends a SIP INVITE message to UE A through server A. The SIP INVITE message carries the session description and message transmission control information received in step 85. In this way, a session path to UE A is created, and the UE A is instructed to send the remaining part of the messages (file-range: 301-1000).

Steps 810-811: UE A sends a SIP 200 OK response message to server B through server A.

Steps 812-813: Server B sends a SIP ACK message to UE A through server A.

Step 814: Server B sends a SIP INVITE message to UE C. The message carries the session description and message transmission control information received in step 85.

Step 815: UE C sends a SIP 200 OK response message to server B.

Step 816: Server B sends a SIP ACK message to UE C to confirm creation of the session path to UE C.

Steps 817-819: Through server A and server B, UE A sends a SIP BYE message to UE B to terminate the session between UE A and UE B. The UE handover is implemented indirectly.

Steps 820-822: UE B sends a SIP 200 OK response message to UE A through server B and server A.

Steps 823-824: UE B sends an MSRP SEND message to server B to transmit the previously received part of the message (file-range: 1-300). Server B sends an MSRP 200 OK response message to UE B.

Steps 825-826: UE A sends an MSRP SEND message to server B to transmit the remaining part of the message (file-range: 301-1000). Server B sends an MSRP 200 OK response message to UE A.

Steps 827-828: Server B combines the different received parts into a complete message, and sends an MSRP SEND message that carries the complete message to UE C through a session path to UE C. UE C sends an MSRP 200 OK response message to server B.

Steps 828-830: UE B sends a SIP BYE message to server B to quit the session. Server B sends a SIP 200 OK response message to UE B to terminate the session between them.

Given above are exemplary embodiments of handover between UEs in a process of sending a message. The practical application is not limited to such embodiments.

Figure 9:
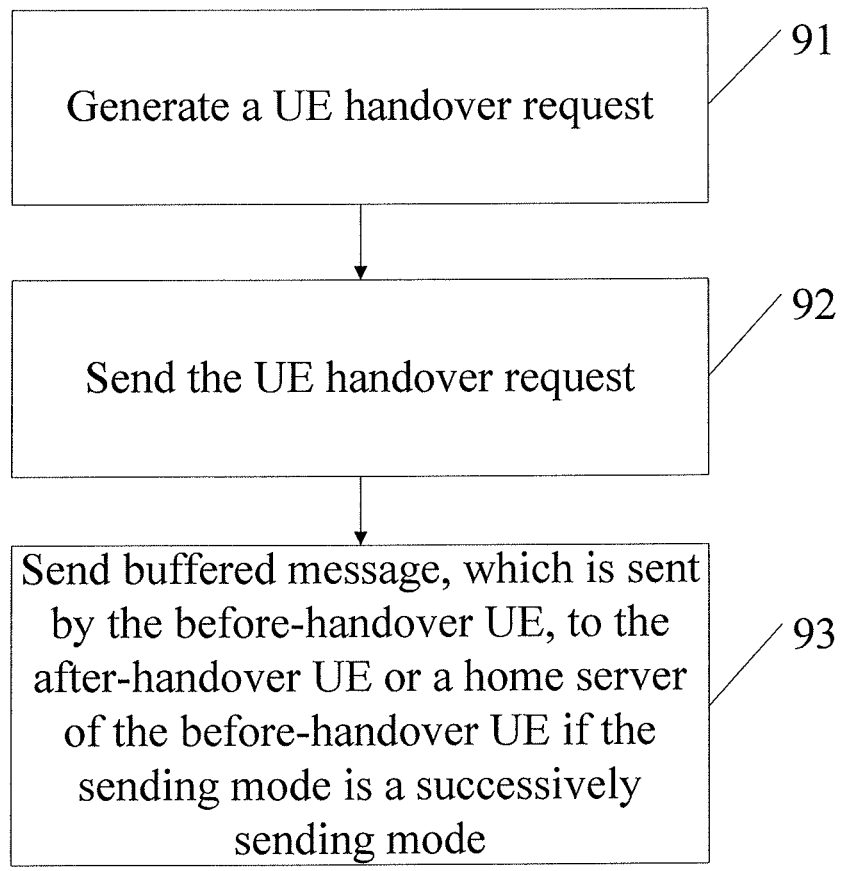
FIG. 9 is another flowchart of a method for handover between UEs in a process of sending a message in an embodiment of the present invention.

FIG. 9 is a flowchart of a method for handover between UEs in a process of sending a message in an embodiment of the present invention. The method includes the following steps:

Step 91: A before-handover UE generates a UE handover request, where the UE handover request carries the identifier of the after-handover UE and indication parameters for sending the message. The indication parameters for sending the message include: message identifier, range of messages to be sent, and message sending mode. The message sending mode is resending or successively sending.

The UE handover request may further carry the identifier of the before-handover UE.

Step 92: The before-handover UE sends the UE handover request so that the receiver of the UE handover request can send the message to the after-handover UE according to the UE handover request and the indication parameters for sending the message.

As shown in FIG. 9, the method in this embodiment may further include:

Step 93: If the sending mode is a successively sending mode, the before-handover UE may send the buffered message, which is sent by the before-handover UE, to the after-handover UE or the home server of the before-handover UE, where the messages correspond to the indication parameters for sending the message in the UE handover request.

In conclusion, through the method for handover between UEs in the process of sending a message in an embodiment of the present invention, the identifier of the before-handover UE, the identifier of the after-handover UE, and indication parameters for sending the message are carried in the UE handover request sent by the before-handover UE, and therefore, the entity that performs the handover operation can send the message exchanged between the entity and the before-handover UE to the after-handover UE accurately.

A UE is provided in an embodiment of the present invention.

Figure 10:
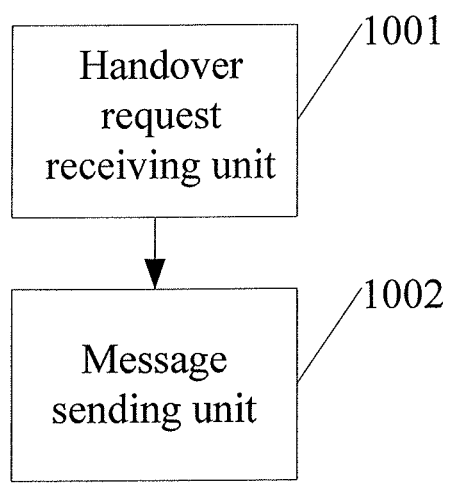
FIG. 10 shows a UE in an embodiment of the present invention.

As shown in FIG. 10, the UE in this embodiment includes:

a handover request receiving unit 1001, configured to: receive a UE handover request sent by a before-handover UE, where the UE handover request carries an identifier of the after-handover UE and indication parameters for sending the message; and a message sending unit 1002, configured to send the corresponding message to the after-handover UE or a home server of the before-handover UE according to the identifier of the after-handover UE and the indication parameters for sending the message.

The UE handover request may further carry the identifier of the before-handover UE.

Figure 11:
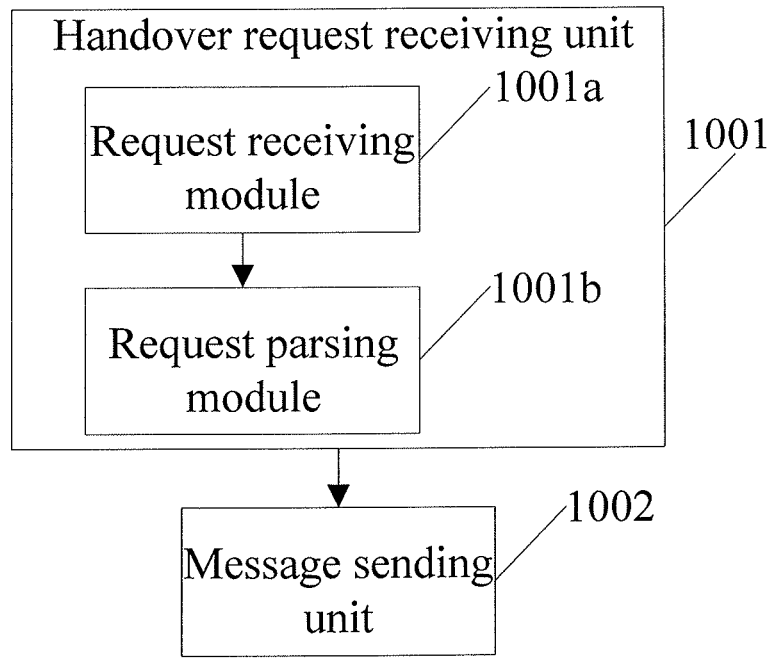
FIG. 11 shows a structure of the UE illustrated in FIG. 10 in an embodiment of the present invention.

As shown in FIG. 11, the handover request receiving unit 1001 includes: a request receiving module 1001a, configured to receive the UE handover request; and a request parsing module 1001b, configured to parse the UE handover request received by the request receiving module, and obtain the message sending range and the message sending mode in the indication parameters for sending the message. In this case, the message sending unit 1002 is configured to: send the messages corresponding to the indication parameters for sending the message to the after-handover UE if the message sending mode obtained by the request parsing module is a resending mode and the message sending range obtained is "all messages"; or send the messages corresponding to the indication parameters for sending the message to the after-handover UE or the home server of the before-handover UE if the message sending mode obtained by the request parsing module is a successively sending mode and the message sending range obtained is "partial messages".

Figure 12:
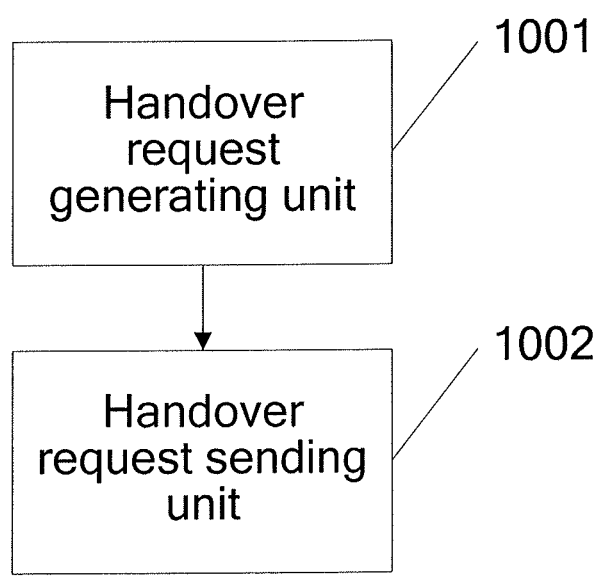
FIG. 12 shows a UE in an embodiment of the present invention.

As shown in FIG. 12, the UE in this embodiment includes:

a handover request generating unit 1201, configured to: generate a UE handover request that carries an identifier of an after-handover UE and indication parameters for sending the message; and a handover request sending unit 1202, configured to send the UE handover request generated by the handover request generating unit. The UE handover request may further carry the identifier of the before-handover UE.

Figure 13:
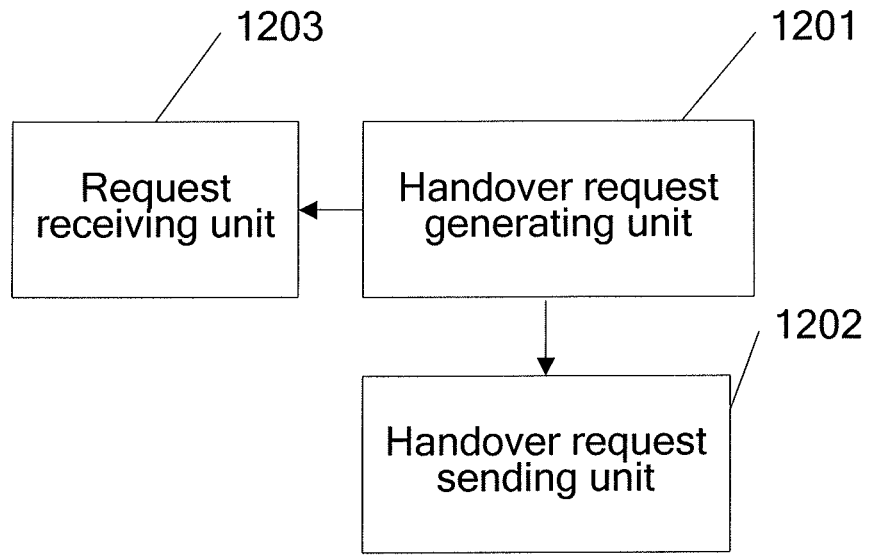
FIG. 13 shows a structure of the UE illustrated in FIG. 12 in an embodiment of the present invention.

As shown in FIG. 13, if the message sending mode is a successively sending mode, the UE further includes: a message sending unit 1203, configured to send the buffered message, which is received by the before-handover UE, to the after-handover UE or the home server of the before-handover UE.

Figure 14:
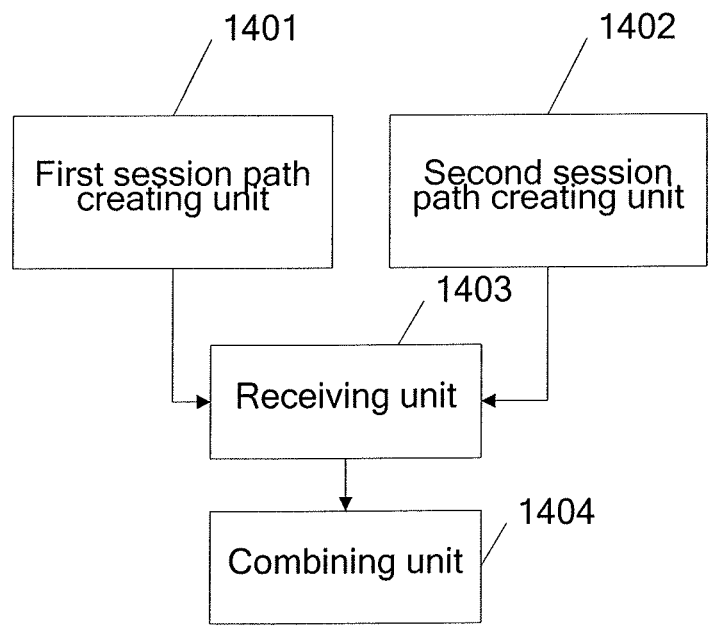
FIG. 14 shows a communication device in an embodiment of the present invention.

As shown in FIG. 14, a communication device provided in an embodiment of the present invention includes:

a first session path creating unit 1401, configured to: receive a session creation request message sent by a before-handover UE, and create a session path to the before-handover UE, where the session creation request message carries a first message identifier parameter and a first message range parameter;

a second session path creating unit 1402, configured to: receive the session creation request message sent by the message sending UE, and create a session path to the message sending UE, where the session creation request message carries a second message identifier parameter and a second message range parameter;

a receiving unit 1403, configured to receive messages through the session path created between the communication device and the before-handover UE and the session path created between the communication device and the message sending UE respectively, where the messages are sent by the before-handover UE and the message sending UE according to the UE handover request; and a combining unit 1404, configured to combine the messages received from the before-handover UE and the message sending UE according to the first message identifier parameter, the first message range parameter, the second message identifier parameter, and the second message range parameter.

The session creation request message may be a SIP INVITE message.

The communication device shown in FIG. 14 may be a UE or server.

Figure 15:
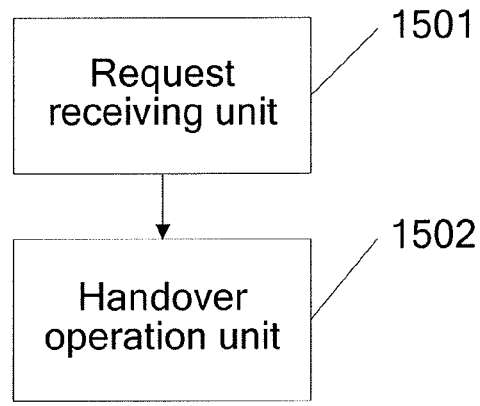
FIG. 15 shows a server in an embodiment of the present invention.

Finally, a server is provided in an embodiment of the present invention. As shown in FIG. 15, the server includes:

a request receiving unit 1501, configured to: receive a UE handover request sent by a before-handover UE, where the UE handover request carries an identifier of the after-handover UE and indication parameters for sending the message; and a handover operation unit 1502, configured to send the buffered messages exchanged between the before-handover UE and the after-handover UE, or buffered message received by the before-handover UE and the after-handover UE, to the after-handover UE according to the UE handover request received by the request receiving unit. The UE handover request may further carry the identifier of the before-handover UE.

Figure 16:
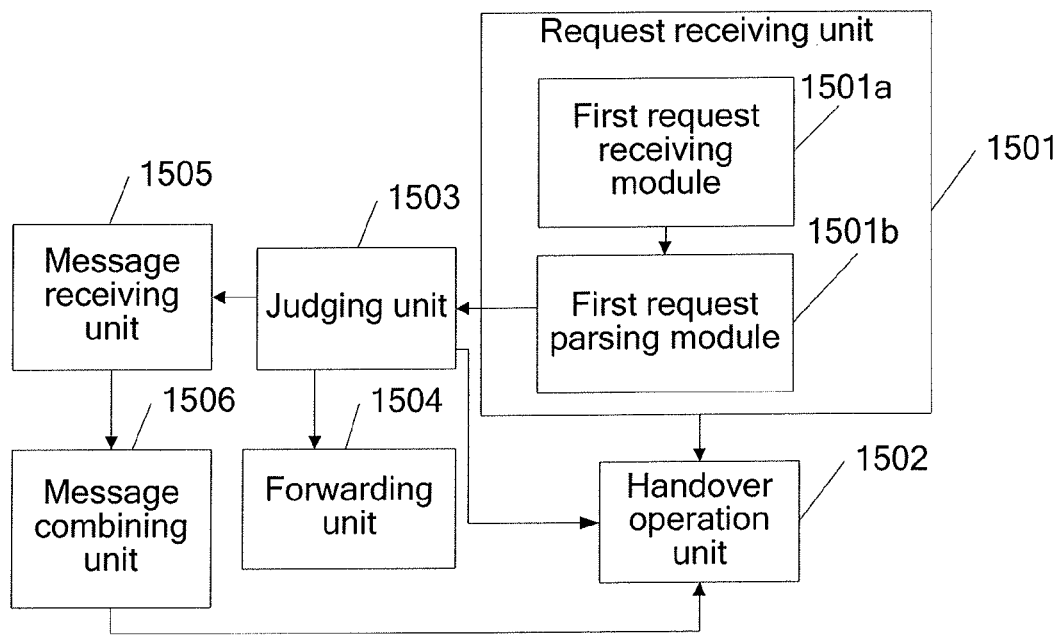
FIG. 16 shows a structure of the server illustrated in FIG. 15 in an embodiment of the present invention.

As shown in FIG. 16, the request receiving unit 1501 includes:

a first request receiving module 1501a, configured to receive the UE handover request; and a first request parsing module 1502b, configured to parse the UE handover request received by the first request receiving module, and obtain the message sending range and the message sending mode in the indication parameters for sending the message.

In order to improve accuracy of UE handover, as shown in FIG. 16, the server in this embodiment further includes:

a judging unit 1503, configured to judge whether the messages exchanged between the message sending UE and the before-handover UE have been buffered if the message sending mode obtained by the first request parsing module is a resending mode and the message sending range obtained is "all messages".

If the judging unit 1503 determines that the server has not buffered the messages, as shown in FIG. 16, the server further includes: a forwarding unit 1504, configured to forward the UE handover request to the message sending UE if the judging unit determines that the server has not buffered the message exchanged between the message sending UE and the before-handover UE. The handover operation unit 1502 is configured to send the buffered messages exchanged between the before-handover UE and the after-handover UE to the after-handover UE if the judging unit determines that the messages exchanged between the message sending UE and the before-handover UE have been buffered.

If the judging unit 1503 determines that the server has buffered the message, as shown in FIG. 16, the server further includes:

a message receiving unit 1505, configured to receive the corresponding messages sent by the before-handover UE and the after-handover UE if the message sending mode obtained by the first request parsing module is a successively sending mode and the message sending range obtained is "partial messages"; and a message combining unit 1506, configured to combine the messages received by the message receiving unit from the before-handover UE and the after-handover UE. In this case, the handover operation unit is configured to send the message combined by the message combining unit to the after-handover UE.

Through the method and the device for handover between UEs in the process of sending a message in an embodiment of the present invention, the identifier of the before-handover UE, the identifier of the after-handover UE, and indication parameters for sending the message are carried in the UE handover request sent by the before-handover UE, and therefore, the entity that performs the handover operation can send the message exchanged between the entity and the before-handover UE to the after-handover UE accurately.

After reading the foregoing embodiments, those skilled in the art are clearly aware that the embodiments of the present invention may be implemented through hardware, or, preferably in most circumstances, through software in addition to a necessary universal hardware platform. Therefore, the technical solution under the present invention or the contributions to the prior art may be embodied as a software product. The software product may be stored in a computer-readable storage medium and incorporates several instructions for instructing a mobile device (for example, mobile station, personal computer, and media player) to execute the method specified in each embodiment of the present invention. The storage media may be ROM/RAM, magnetic disk, or CD-ROM. <

The above descriptions are merely exemplary embodiments of the present invention, but not intended to limit the scope of the present invention. Any modifications, variations or replacement that can be easily derived by those skilled in the art should fall within the scope of the present invention. Therefore, the protection scope of the present invention is subject to the appended claims.

What is claimed is:

1. A method for handover between User Equipments (UEs) in a process of sending a message, comprising:

receiving, by a home server of a before-handover UE, a UE handover request sent by the before-handover UE, wherein the UE handover request carries an identifier of an after-handover UE, an identifier of the before-handover UE, an identifier of an message sending UE, and indication parameters for sending a message, wherein a message sending mode indicated in the indication parameters for sending the message is a successively sending mode, message sending directions indicated in the indication parameters for sending the message comprise a direction of sending a message from the before-handover UE to a home server of the before-handover UE and a direction of sending a message from a message sending UE to the home server of the before-handover UE; a message sending range indicated in the indication parameters for sending the message comprises a range of messages sent from the before-handover UE to the home server of the before-handover UE and a range of messages sent from the message sending UE to the home server of the before-handover UE; and creating, by the home server of the before-handover UE, a message sending session path between the home server of the before-handover UE and the message sending UE, the before-handover UE, and the after-handover UE each according to the identifier of the message sending UE, the identifier of the before-handover UE, the identifier of the after-handover UE, and the indication parameters for sending the message;

receiving, by the home server of the before-handover UE, a first message sent by the message sending UE through the message sending session path between the home server of the before-handover UE and the message sending UE, wherein the first message carries a first message identifier parameter and a first message range parameter;

receiving, by the home server of the before-handover UE, a second message sent by the before-handover UE through the message sending session path between the home server of the before-handover UE and the before-handover UE, wherein the second message carries a second message identifier parameter and a second message range parameter;

the home server of the before-handover UE combining, by the home server of the before-handover UE, the messages received from the before-handover UE and the message sending UE to generate a complete message according to the first message identifier parameter, the first message range parameter, the second message identifier parameter, and the second message range parameter; and sending, by the home server of the before-handover UE, the combined message to the after-handover UE through the message sending session path between the home server of the before-handover UE and the after-handover UE.

2. A User Equipment (UE), comprising:

a handover request receiving unit, configured to: receive a UE handover request sent by a before-handover UE, wherein the UE handover request carries an identifier of an after-handover UE and indication parameters for sending a message, wherein the indication parameters for sending a message comprises a message sending mode and a message sending range, wherein the handover request receiving unit comprises: a request receiving module, configured to receive the UE handover request; and a request parsing module, configured to: parse the UE handover request received by the request receiving module, and obtain the identifier of the after-handover UE and the indication parameters for sending the message; and a message sending unit, is configured to send a corresponding message to the after-handover UE if the message sending mode indicated in the indication parameters for sending the message obtained by the request parsing module is a resending mode and the message sending range indicated in the indication parameters for sending the message is "all messages;" or a message sending unit, is configured to send the corresponding message to the after-handover UE or the home server of the before-handover UE if the message sending mode indicated in the indication parameters for sending the message obtained by the request parsing module is a successively sending mode and the message sending range indicated in the indication parameters for sending the message is "partial messages."

3. A communication device, comprising:

a first session path creating unit, configured to: receive a session creation request message sent by before-handover User Equipment (UE), and create a session path to the before-handover UE, wherein the session creation request message carries a first message identifier parameter and a first message range parameter;

a second session path creating unit, configured to: receive the session creation request message sent by a message sending UE, and create a session path to the message sending UE, wherein the session creation request message carries a second message identifier parameter and a second message range parameter;

a receiving unit, configured to receive messages through the session path created between the communication device and the before-handover UE and the session path created between the communication device and the message sending UE respectively, wherein the messages are sent by the before-handover UE and the message sending UE according to the UE handover request; and a combining unit, configured to combine the messages received from the before-handover UE and the message sending UE according to the first message identifier parameter, the first message range parameter, the second message identifier parameter, and the second message range parameter.

4. A server, comprising:

a request receiving unit, configured to: receive a User Equipment (UE) handover request sent by a before-handover UE, wherein the UE handover request carries an identifier of an after-handover UE and indication parameters for sending a message, wherein the indication parameters for sending a message comprises a message sending mode and a message sending range; and a handover operation unit, configured to send messages exchanged between the before-handover UE and a message sending UE, messages between the after-handover UE and the message sending UE; or messages received by the before-handover UE and the after-handover UE from the message sending UE, to the after-handover UE according to the UE handover request received by the request receiving unit, wherein the request receiving unit comprises:

a first request receiving module, configured to receive the UE handover request;

a first request parsing module, configured to parse the UE handover request received by the first request receiving module, and obtain the message sending range and the message sending mode in the indication parameters for sending the message.

5. The server according to claim 4, further comprising:

a judging unit, configured to determine whether the messages exchanged between the message sending UE and the before-handover UE have been buffered if the message sending mode obtained by the first request parsing module is a resending mode and the message sending range obtained is "all messages"; and a forwarding unit, configured to forward the UE handover request to the message sending UE if the judging unit, determines that the server has not buffered the messages exchanged between the message sending UE and the before-handover UE; and the handover operation unit is configured to send the corresponding messages received by the before-handover UE and the after-handover UE from the message sending UE to the after-handover UE if the judging unit, determines that the messages exchanged between the message sending UE and the before-handover UE have been buffered.

6. The server according to claim 4, further comprising:

a message receiving unit, configured to receive corresponding messages sent by the before-handover UE and the after-handover UE if the message sending mode obtained by the first request parsing module, is a successively sending mode and the message sending range obtained is "partial messages";

a message combining unit, configured to combine the messages received by the message receiving unit, from the before-handover UE and the after-handover UE; and the handover operation unit, is configured to send the message combined by the message combining unit, to the after-handover UE.

7. A method for handover between User Equipments (UEs) in a process of sending a message, comprising:

receiving, by a message sending UE, the UE handover request forwarded by a home server of a before-handover UE, wherein the UE handover request carries an identifier of an after-handover UE, and indication parameters for sending a message, wherein a message sending mode indicated in the indication parameters for sending the message is a successively sending mode; message sending directions indicated in the indication parameters for sending the message comprise a direction of sending a message from the before-handover UE to a home server of the before-handover UE and a direction of sending a message from a message sending UE to the home server of the before-handover UE; a message sending range indicated in the indication parameters for sending the message comprises a range of messages sent from the before-handover UE to the home server of the before-handover UE and a range of messages sent from the message sending UE to the home server of the before-handover UE;

receiving, by the message sending UE, the UE handover request forwarded by a home server of the before-handover UE; and obtaining, by message sending UE, the identifier of the after-handover UE and the indication parameters for sending the message;

creating, by the before-handover UE, a message sending session path between the before-handover UE and the after-handover UE, wherein the message sending session path between the before handover UE and the after-handover UE is capable of sending a message;

sending, by the before-handover UE, a second message to the after-handover UE through the message sending session path between the before-handover UE and the after-handover UE, wherein the second message carries a second message identifier parameter and a second message range parameter; and connecting, by the after-handover UE, up the messages received by the before-handover UE and the message sending UE to generate a complete message according to the first message identifier parameter, the first message range parameter, the second message identifier parameter, and the second message range parameter.

8. A method for handover between User Equipments(UEs) in a process of sending a message, comprising:
- receiving, by a home server of a before-handover UE, a UE handover request sent by the before-handover UE, wherein the UE handover request carries an identifier of an after-handover UE, an identifier of the before-handover, an identifier of an message sending UE and indication parameters for sending a message, wherein a message sending mode indicated in the indication parameters for sending the message is a resending mode;
- obtaining, by the home server of the before-handover, the identifier of the after-handover UE and the indication parameters for sending the message after determining that the home server of the before-handover has buffered message exchanged between a message sending UE and the before-handover UE;
- creating, by the home server of the before-handover UE, a message sending session path between the home server of the before-handover UE and the after-handover UE according to the identifier of the after-handover UE and the indication parameters for sending the message, wherein the message sending session path between the home server of the before-handover UE and the after-handover UE is capable of sending a message according to the indication parameters for sending the message; and
- sending, by the home server of the before-handover UE, the message which exchanged between the message sending UE and the before-handover UE to the after-handover UE through the message sending session path between the home server of the before-handover UE and the after-handover UE.

9. A method for handover between User Equipments(UEs) in a process of sending a message, comprising:
- receiving, by a message sending UE, a UE handover request forwarded by a home server of a before-handover UE, wherein the UE handover request carries an identifier of an after-handover UE, and indication parameters for sending a message, wherein a message sending mode indicated in the indication parameters for sending the message is a resending mode;
- obtaining, by the message sending UE, the identifier of the after-handover UE and the indication parameters for sending the message;
- creating, by the message sending UE, a message sending session path between the message sending UE and the after-handover UE according to the identifier of the after-handover UE and the indication parameters for sending the message; and
- sending, by the message sending UE, the messages which exchanged between the message sending UE and the before-handover UE to the after-handover UE to the after-handover UE through the message sending session path between the message sending UE and the after-handover UE.

* * * * *